(12) United States Patent
Wang et al.

(10) Patent No.: US 11,620,431 B2
(45) Date of Patent: Apr. 4, 2023

(54) SYSTEM AND METHOD FOR PERFORMING DEPTH-DEPENDENT OXIDATION MODELING IN A VIRTUAL FABRICATION ENVIRONMENT

(71) Applicant: Coventor, Inc., Cary, NC (US)

(72) Inventors: Qing Peng Wang, Shanghai (CN); Shi-hao Huang, Kaohsiung (TW); Yu De Chen, Tainan (TW); Joseph Ervin, San Jose, CA (US)

(73) Assignee: Coventor, Inc., Cary, NC (US)

( * ) Notice: Subject to any disclaimer, the term of this patent is extended or adjusted under 35 U.S.C. 154(b) by 0 days.

(21) Appl. No.: 17/682,364

(22) Filed: Feb. 28, 2022

(65) Prior Publication Data
US 2022/0366119 A1 Nov. 17, 2022

Related U.S. Application Data

(62) Division of application No. 17/130,473, filed on Dec. 22, 2020, now Pat. No. 11,301,613.

(60) Provisional application No. 62/952,928, filed on Dec. 23, 2019.

(51) Int. Cl.
| | |
|---|---|
| G06F 30/30 | (2020.01) |
| G06F 30/398 | (2020.01) |
| G06F 30/392 | (2020.01) |
| H01L 21/311 | (2006.01) |
| H01L 21/02 | (2006.01) |
| G06F 111/10 | (2020.01) |
| G06F 111/16 | (2020.01) |

(52) U.S. Cl.
CPC ........ G06F 30/398 (2020.01); G06F 30/392 (2020.01); H01L 21/02233 (2013.01); H01L 21/31105 (2013.01); G06F 2111/10 (2020.01); G06F 2111/16 (2020.01)

(58) Field of Classification Search
CPC .. G06F 30/398; G06F 30/392; G06F 2111/10; G06F 2111/16; H01L 21/31105; H01L 21/02233; H01L 21/3065; H01L 21/02236
USPC ...................................................... 716/110
See application file for complete search history.

(56) References Cited

U.S. PATENT DOCUMENTS

| | | | | |
|---|---|---|---|---|
| 7,155,689 B2 * | 12/2006 | Pierrat | ................ | G06F 30/398 |
| | | | | 716/52 |
| 7,996,795 B2 * | 8/2011 | Moroz | ................... | G06F 30/20 |
| | | | | 716/54 |
| 8,359,562 B2 | 1/2013 | Sarma et al. | | |
| 8,959,464 B2 | 2/2015 | Greiner et al. | | |

(Continued)

*Primary Examiner* — Jack Chiang
*Assistant Examiner* — Brandon Bowers
(74) *Attorney, Agent, or Firm* — McCarter & English, LLP; John S. Curran

(57) ABSTRACT

Systems and methods for performing depth-dependent oxidation modeling and depth-dependent etch modeling in a virtual fabrication environment are discussed. More particularly, a virtual fabrication environment models, as part of a process sequence, oxidant dispersion in a depth-dependent manner and simulates the subsequent oxidation reaction based on the determined oxidant thickness along an air/silicon interface. Further the virtual fabrication environment performs depth-dependent etch modeling as part of a process sequence to determine etchant concentration and simulate the etching of material along an air/material interface.

22 Claims, 23 Drawing Sheets

(56) References Cited

U.S. PATENT DOCUMENTS

| | | |
|---|---|---|
| 10,032,681 B2 | 7/2018 | Bailey, III et al. |
| 2021/0150116 A1 | 5/2021 | Fan et al. |
| 2021/0192120 A1 | 6/2021 | Wang et al. |

\* cited by examiner

Figure 8

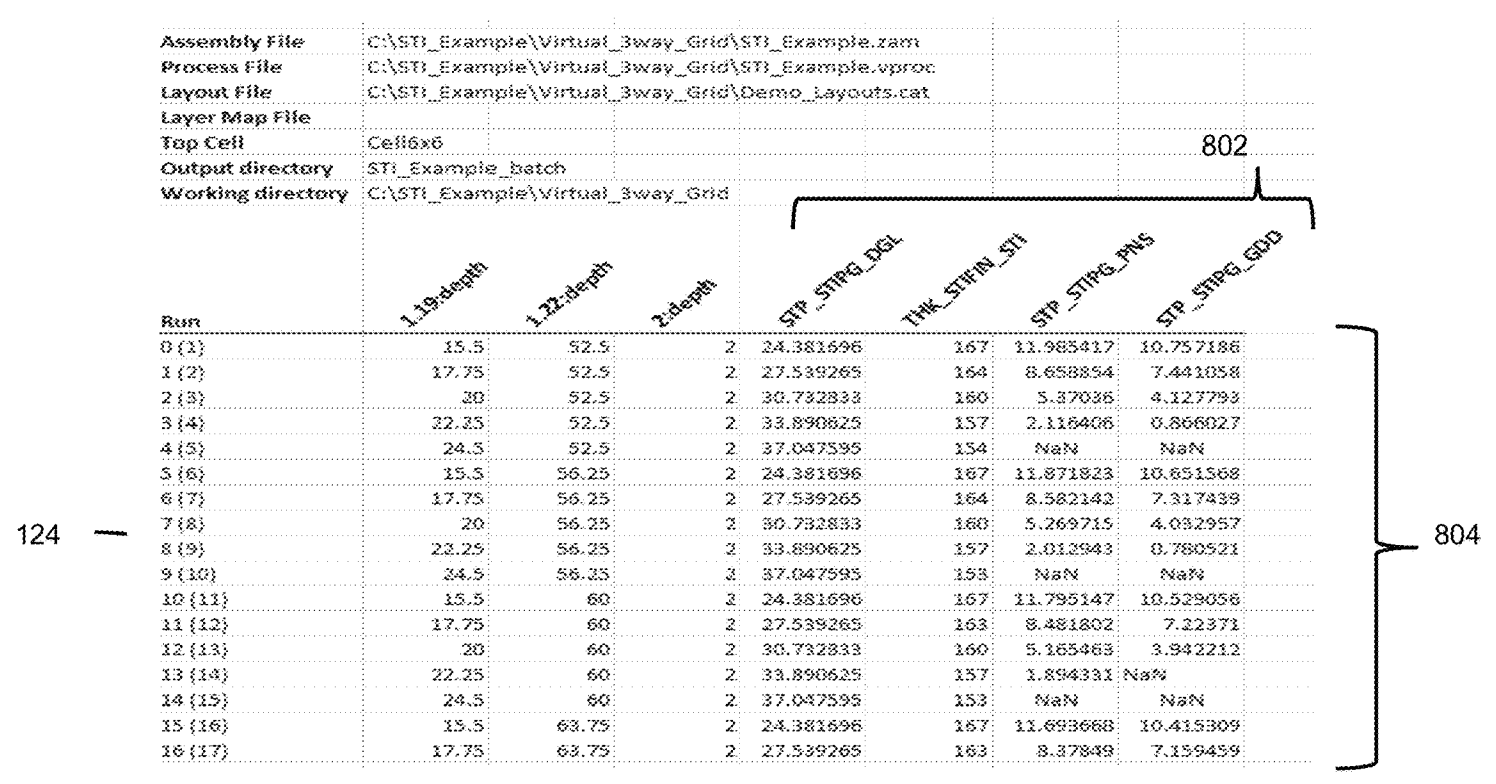

| Assembly File | C:\STI_Example\Virtual_3way_Grid\STI_Example.ram |
| --- | --- |
| Process File | C:\STI_Example\Virtual_3way_Grid\STI_Example.rpn |
| Layout File | C:\STI_Example\Virtual_3way_Grid\STI_Example.vpson |
| Layer Map File | C:\STI_Example\Virtual_3way_Grid\Demo_Layouts.cat |
| Top Cell | Cell6x6 |
| Output directory | STI_Example_batch |
| Working directory | C:\STI_Example\Virtual_3way_Grid |

| Run | 119_depth | 122_depth | 2_depth | STP_DG1 | TRK_STPIN_STI | STP_STPC_PNS | STP_STP_GDD |
| --- | --- | --- | --- | --- | --- | --- | --- |
| 0 (1) | 15.5 | 52.5 | 2 | 24.381696 | 157 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.370386 | 4.127793 |
| 3 (4) | 22.25 | 52.5 | 2 | 33.890625 | 157 | 2.116406 | 0.866027 |
| 4 (5) | 24.5 | 52.5 | 2 | 37.047595 | 154 | NaN | NaN |
| 5 (6) | 15.5 | 56.25 | 2 | 24.381696 | 167 | 10.871823 | 10.651368 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 3 | 33.890625 | 157 | 2.012943 | 0.780521 |
| 9 (10) | 24.5 | 56.25 | 3 | 37.047595 | 153 | NaN | NaN |
| 10 (11) | 15.5 | 60 | 3 | 24.381696 | 167 | 11.795147 | 10.529056 |
| 11 (12) | 17.75 | 60 | 3 | 27.539265 | 163 | 8.481802 | 7.22371 |
| 12 (13) | 20 | 60 | 3 | 30.732833 | 160 | 5.165463 | 3.942212 |
| 13 (14) | 22.25 | 60 | 2 | 33.890625 | 157 | 1.854331 | NaN |
| 14 (15) | 24.5 | 60 | 2 | 37.047595 | 153 | NaN | NaN |
| 15 (16) | 15.5 | 63.75 | 2 | 24.381696 | 167 | 11.693668 | 10.413309 |
| 16 (17) | 17.75 | 63.75 | 2 | 27.539265 | 163 | 8.378849 | 7.159459 |

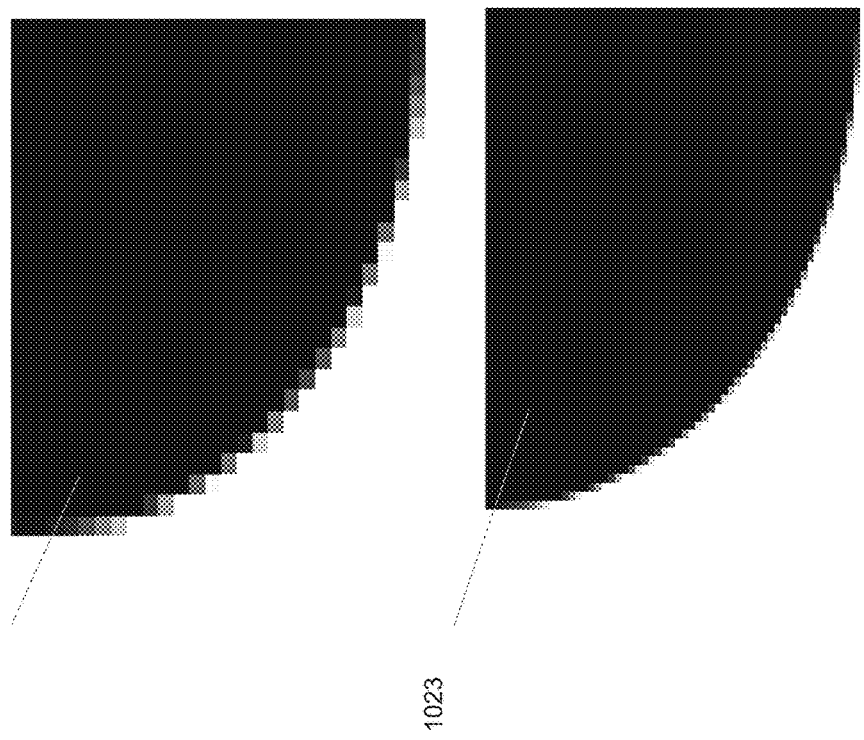
Figure 10B
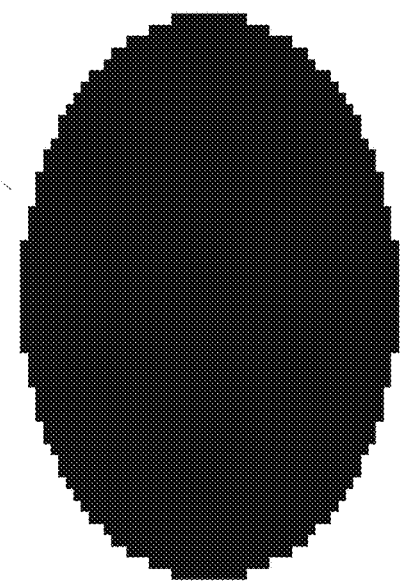

Figure 13
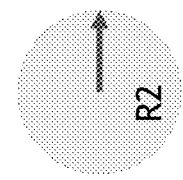
R2=0.44*THK(z)
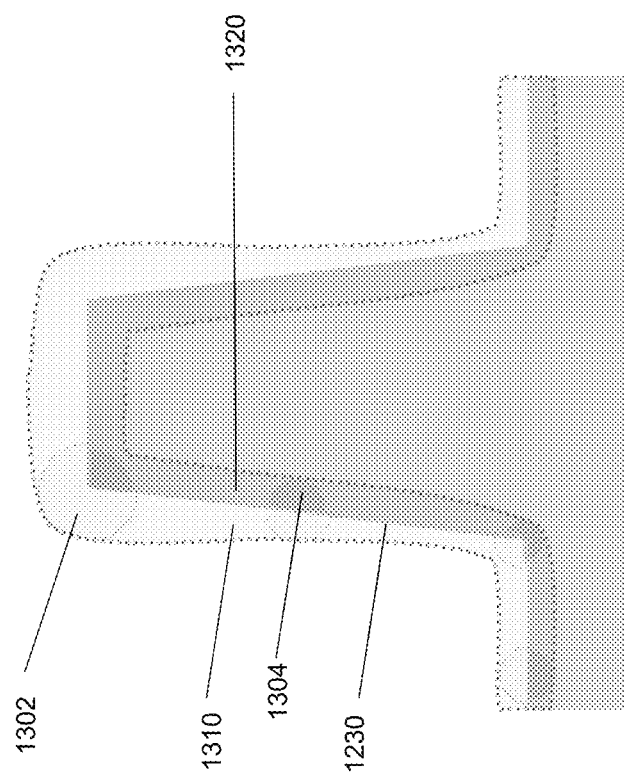
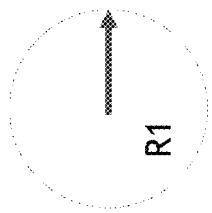
R1=0.56*THK(z)

Figure 21

```
                    2100
            Parameters

▼ wafer         Wafer
     2102      Comment
               Wafer      W1
          ▼ seed          Material
     2104      Comment
               Material:  /Metals/W
          ▼ mat           Material
     2106      Comment
               Material:  /Metals/W
          ▼ thk           Custom
     2108      Comment
               Value      4
          ▼ length        Custom
     2110      Comment
               Value      200
```

SYSTEM AND METHOD FOR PERFORMING DEPTH-DEPENDENT OXIDATION MODELING IN A VIRTUAL FABRICATION ENVIRONMENT

RELATED APPLICATION

This application is a divisional application of U.S. patent application Ser. No. 17/130,473, entitled "Systems and Methods for Performing Depth-Dependent Oxidation Modeling and Depth-Dependent Etch Modeling in a Virtual Fabrication Environment", filed Dec. 22, 2020, which claims priority to, and the benefit of, U.S. Provisional Patent Application No. 62/952,928, entitled "Systems and Methods for Performing Depth Dependent Oxidation Modeling in a Virtual Fabrication Environment", filed Dec. 23, 2019, the contents of both of which are incorporated herein by reference in their entirety.

BACKGROUND

Semiconductor development organizations at integrated device manufacturers (IDMs) and independent foundries spend significant resources developing the integrated sequence of process operations used to fabricate the chips (integrated circuits (ICs)) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive. Recent semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide the ability to perform depth-dependent oxidation modeling in a virtual fabrication environment. More particularly, embodiments enable the virtual fabrication environment to model, as part of a process sequence, oxidant dispersion in a depth-dependent manner and simulate the subsequent oxidation reaction based on the determined oxidant thickness along an air/silicon interface in a 3D structural model. Further, embodiments of the present invention provide the ability to perform depth-dependent etch modeling in a virtual fabrication environment. More particularly, embodiments enable the virtual fabrication environment to model, as part of a process sequence, etchant concentration in a depth-dependent manner and simulate the subsequent etching of material along the air/material interface in a 3D structural model.

In one embodiment, a computing device-implemented method for performing depth-dependent oxidation modeling in a virtual fabrication environment includes receiving a process sequence for a semiconductor device structure to be virtually fabricated. The process sequence includes a depth-dependent oxidation modeling step that indicates a point during the process sequence for depth-dependent oxidation modeling to be performed. The method also includes performing with the computing device a virtual fabrication run that models an integrated process flow used to physically fabricate the semiconductor device structure by using the process sequence and 2D design data to simulate patterning, material addition and/or material removal steps performed to physically fabricate the semiconductor device structure. The virtual fabrication run executes the process sequence up until the depth-dependent oxidation modeling step and builds a 3D structural model of the semiconductor device structure. The 3D structural model is predictive of a result of a physical fabrication of the semiconductor device structure. The virtual fabrication run also performs the depth-dependent oxidation modeling step within a region of the 3D structural model. The depth-dependent oxidation modeling step generates depth-dependent oxidation data. The method additionally outputs the depth-dependent oxidation data generated from the depth-dependent oxidation modeling step.

In another embodiment, a system for performing depth-dependent oxidation modeling in a virtual fabrication environment includes at least one computing device equipped with one or more processors that is configured to generate a virtual fabrication environment that includes a depth-dependent modeling module. The virtual fabrication environment is configured to receive a process sequence for a semiconductor device structure to be virtually fabricated. The process sequence includes a depth-dependent oxidation modeling step that indicates a point during the process sequence for depth-dependent oxidation modeling to be performed. The virtual fabrication environment is also configured to perform with the computing device a virtual fabrication run that models an integrated process flow used to physically fabricate the semiconductor device structure by using the process sequence and 2D design data to simulate patterning, material addition and/or material removal steps performed to physically fabricate the semiconductor device structure. The virtual fabrication run executes the process sequence up until the depth-dependent oxidation modeling step, the executing building a 3D structural model of the semiconductor device structure. The 3D structural model is predictive of a result of a physical fabrication of the semiconductor device structure. The virtual fabrication run further performs the depth-dependent oxidation modeling step within a region of the 3D structural model. The depth-dependent oxidation modeling step generates depth-dependent oxidation data. The system additionally includes a display surface in communication with the at least one computing device. The display surface is configured to display the depth-dependent oxidation modeling data.

In an embodiment, a computing device-implemented method for performing depth-dependent etch modeling in a virtual fabrication environment includes receiving a process sequence for a semiconductor device structure to be virtually fabricated. The process sequence includes a depth-dependent etch modeling step that indicates a point during the process sequence for depth-dependent etch modeling to be performed. The method also includes performing with the computing device a virtual fabrication run that models an integrated process flow used to physically fabricate the semiconductor device structure by using the process sequence and 2D design data to simulate patterning, material addition and/or material removal steps performed to physically fabricate the semiconductor device structure. The virtual fabrication run executes the process sequence up until the depth-dependent etch modeling step and builds a 3D structural model of the semiconductor device structure. The 3D structural model is predictive of a result of a physical fabrication of the semiconductor device structure. The virtual fabrication run also performs the depth-dependent etch modeling step within a region of the 3D structural model. The depth-dependent etch modeling step generates depth-dependent etch result data. The method additionally outputs the depth-dependent etch result data generated from the depth-dependent etch modeling step.

In another embodiment, a system for performing depth-dependent etch modeling in a virtual fabrication environment includes at least one computing device equipped with one or more processors that is configured to generate a virtual fabrication environment that includes a depth-dependent modeling module. The virtual fabrication environment is configured to receive a process sequence for a semiconductor device structure to be virtually fabricated. The process sequence includes a depth-dependent etch modeling step that indicates a point during the process sequence for depth-dependent etch modeling to be performed. The virtual fabrication environment is also configured to perform with the computing device a virtual fabrication run that models an integrated process flow used to physically fabricate the semiconductor device structure by using the process sequence and 2D design data to simulate patterning, material addition and/or material removal steps performed to physically fabricate the semiconductor device structure. The virtual fabrication run executes the process sequence up until the depth-dependent etch modeling step, the executing building a 3D structural model of the semiconductor device structure. The 3D structural model is predictive of a result of a physical fabrication of the semiconductor device structure. The virtual fabrication run further performs the depth-dependent etch modeling step within a region of the 3D structural model. The depth-dependent etch modeling step generates depth-dependent etch result data. The system additionally includes a display surface in communication with the at least one computing device. The display surface is configured to display the depth-dependent etch result data.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 8 depicts an exemplary tabular-formatted display of virtual metrology data generated in a virtual experiment provided by the virtual fabrication environment;

FIG. 10B depicts exemplary staircasing effects addressed by adjusting voxel size;

FIG. 13 depicts an exemplary traversal to mark the oxidation areas along the interface in an exemplary embodiment;

FIG. 21 depicts a graphical user interface configured to accept parameters for a depth-dependent etch modeling step in an exemplary embodiment.

DETAILED DESCRIPTION

Embodiments of the present invention provide a virtual fabrication environment enabling depth-dependent oxidation modeling and/or depth-dependent etch modeling as part of a virtual fabrication process sequence. However, prior to discussing the depth-dependent oxidation modeling and depth-dependent etch modeling provided by embodiments in greater detail, an exemplary 3D virtual fabrication environment which may be utilized to practice the embodiments is first described.

Exemplary Virtual Fabrication Environment

Figure 1:
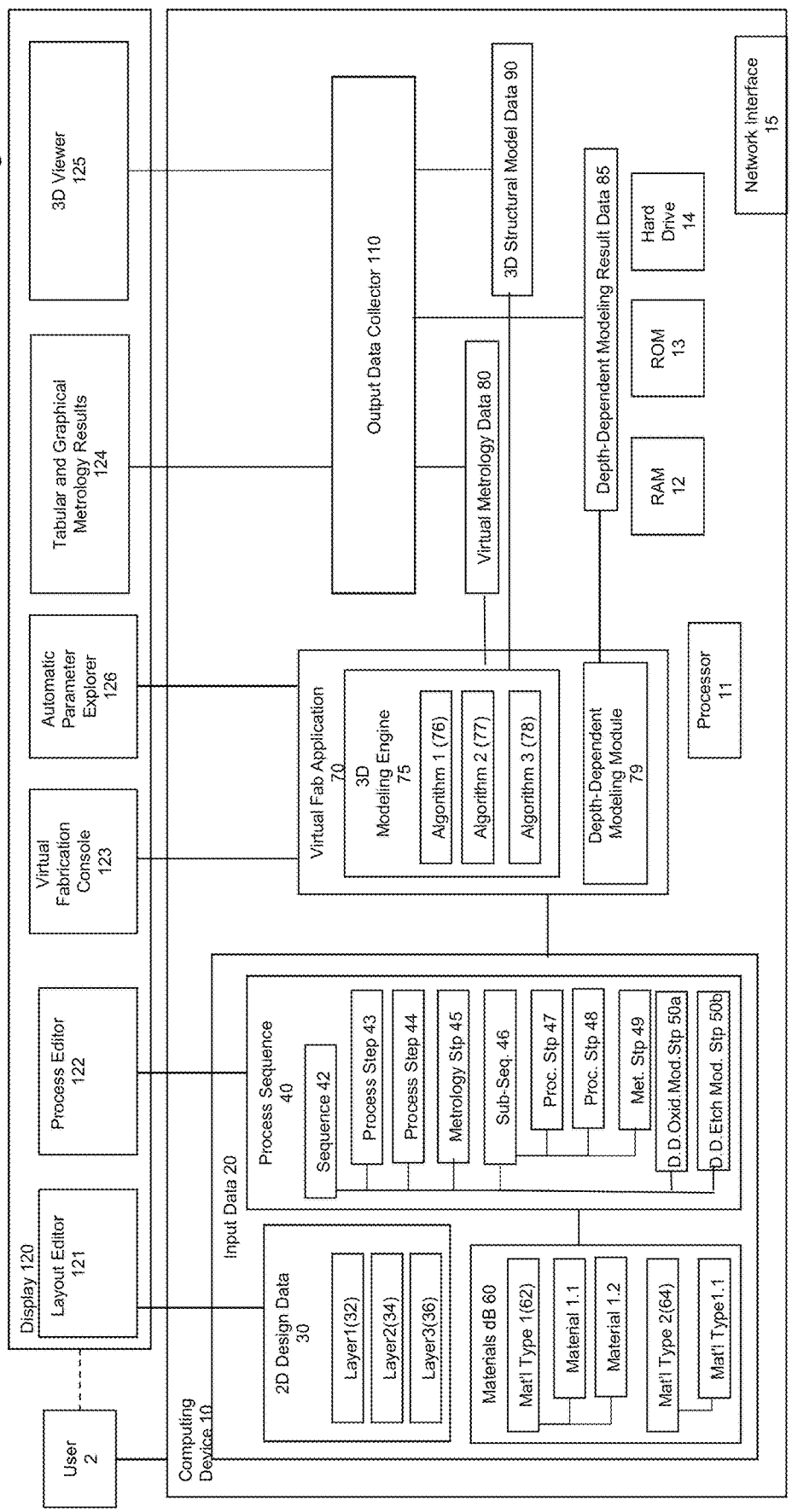
FIG. 1 depicts an exemplary virtual fabrication environment suitable for practicing an embodiment of the present invention.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with a processor 11 and able to support the operations of 3D modeling engine 75 (described further below). The processor may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. Virtual fabrication application 70 may also include depth-dependent modeling module 79 containing executable instructions for modeling depth-dependent oxidation and/or modeling depth-dependent etching. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures.

Input data 20 includes both 2D design data 30 and process sequence 40. For example, process sequence 40 may be composed of multiple process steps 43, 44, 47, 48 and 49. Process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name or other identifier and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. In an alternative embodiment the measurement location may be specified by alternate means such as (x, y) coordinates in the 2D design data or some other means of specifying a location in the 2D design data 30 instead of through the use of a locator shape. Process sequence may also include one or more depth-dependent oxidation modeling steps 50a and/or depth-dependent etching modeling steps 50b that indicate a point in the process sequence during a virtual fabrication run at which a depth-dependent oxidation modeling operation or depth-dependent etch modeling operation should be performed. The performance of the process sequence 40 during a virtual fabrication run may generate virtual metrology data 80, depth-dependent modeling data 85 (representing the results of the performance of the depth-dependent oxidation modeling step 50a and/or depth-dependent etch modeling step 50b) and 3D structural model data 90. 3D structural model data 90 may be used to generate a 3D view of the structural model of the semiconductor device structure which may be displayed in the 3D viewer 125. Virtual metrology data 80 and depth-dependent modeling data 85 may be processed and presented to a user 2 in the tabular and graphical metrology results view 124.

Figure 2:
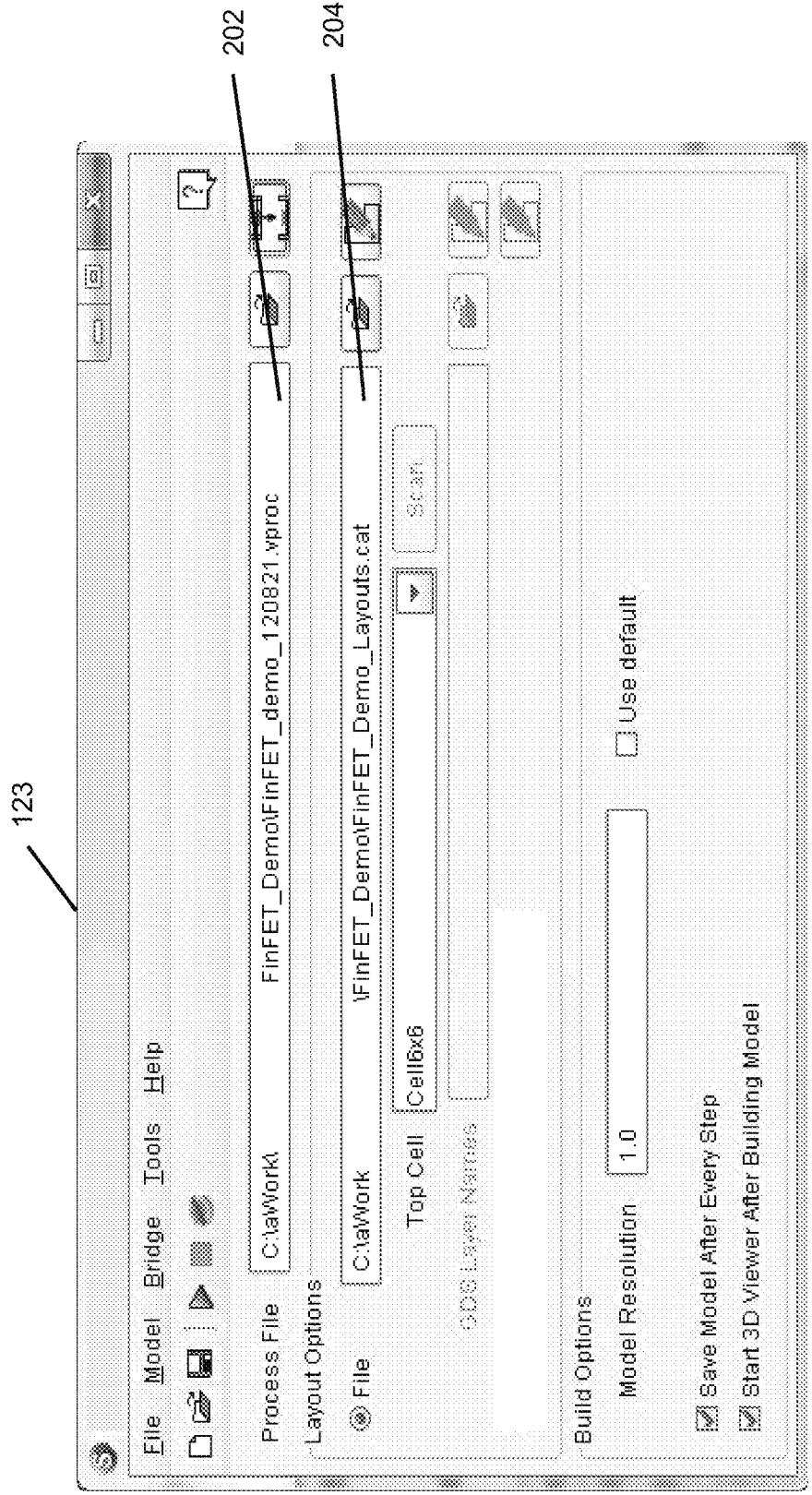
FIG. 2 depicts an exemplary virtual fabrication console provided by the virtual fabrication environment.

FIG. 2 depicts an exemplary virtual fabrication console 123 provided by the virtual fabrication environment to set up a virtual fabrication run. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
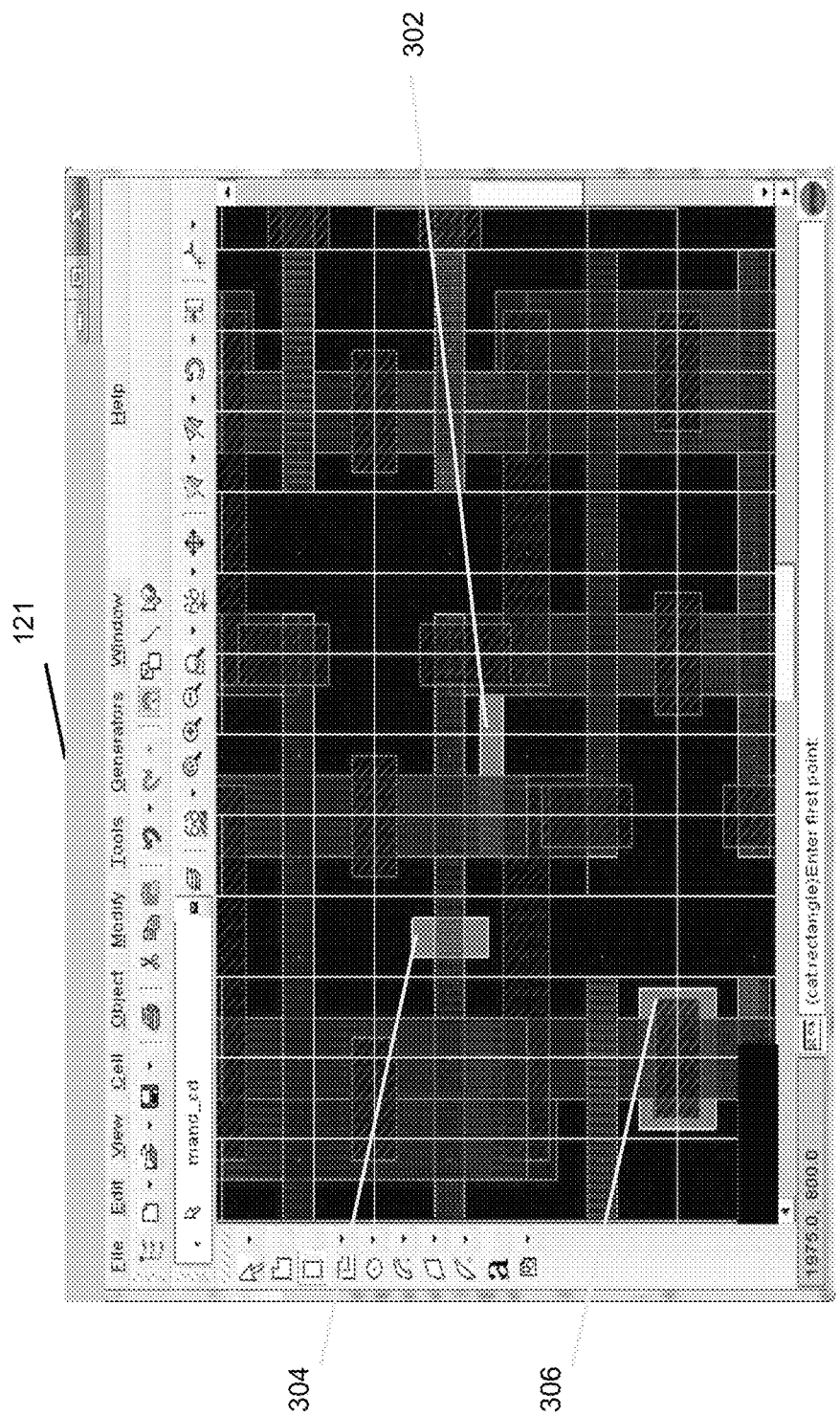
FIG. 3 depicts an exemplary layout editor provided by the virtual fabrication environment.

FIG. 3 depicts an exemplary layout editor provided by the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes should also be considered within the scope of the present invention. The design data is used in combination with the process data and materials database to build a 3D structural model.

Figure 4:
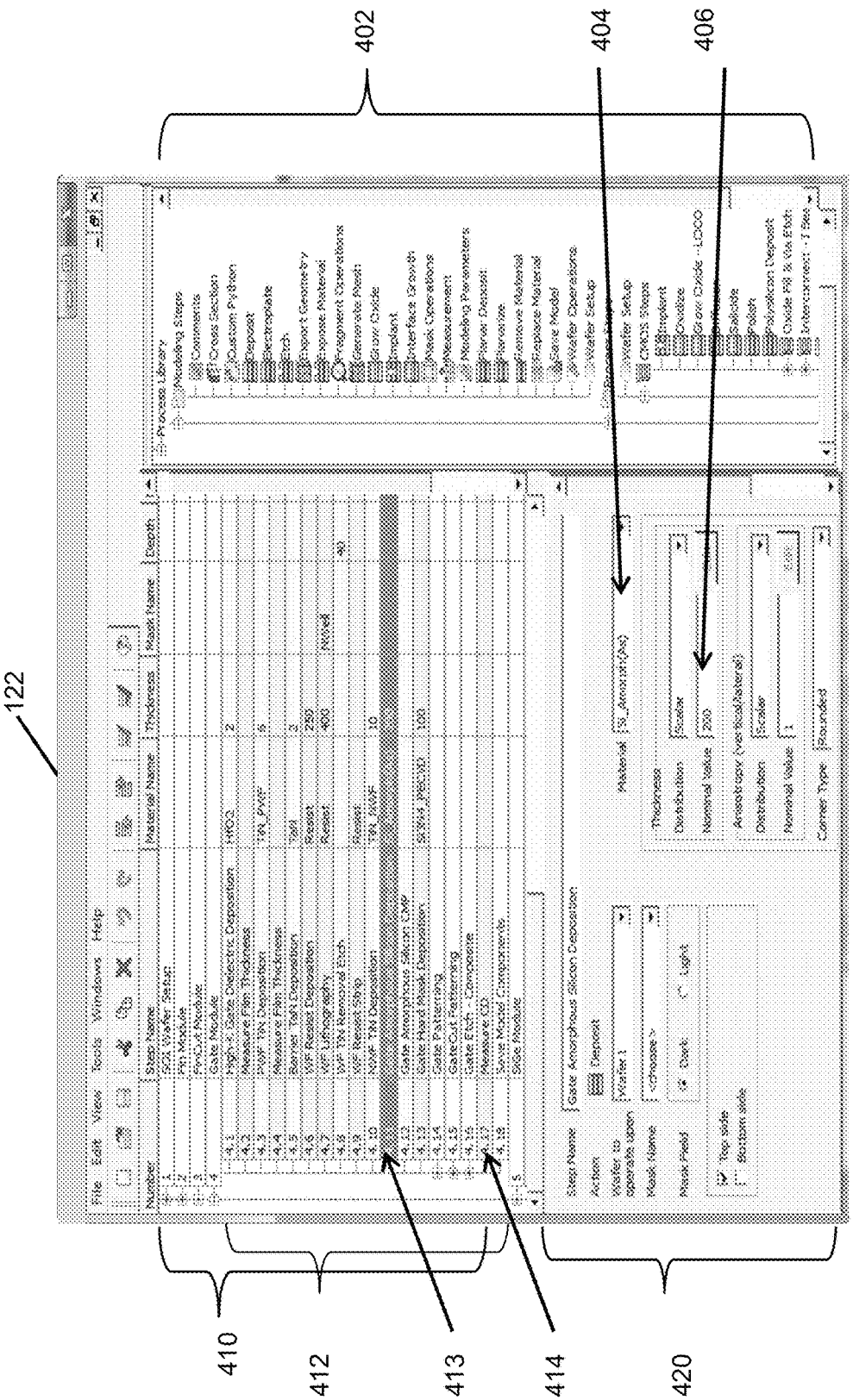
FIG. 4 depicts an exemplary process editor provided by the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 provided by the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. By inserting the virtual metrology steps directly in the fabrication sequence, the embodiment of the present invention allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
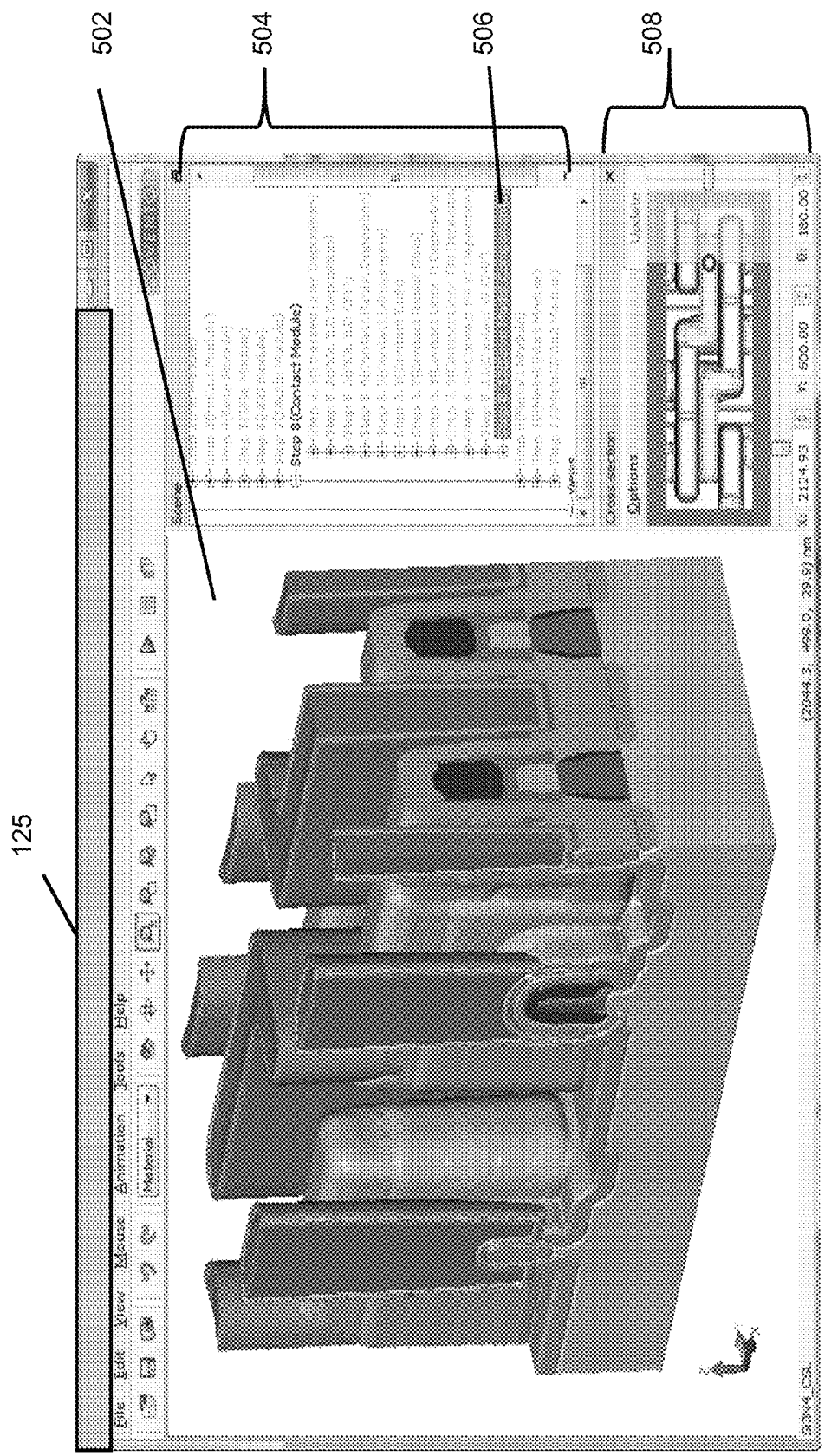
FIG. 5 depicts an exemplary 3D viewer provided by the virtual fabrication environment.

FIG. 5 depicts an exemplary 3D viewer 125 provided by the virtual fabrication environment. The 3D viewer 75 may include a 3D view canvas 502 for displaying 3D models generated by the 3D modeling engine 75. The 3D viewer 75 may display saved states 504 in the process sequence and allow a particular state to be selected 506 and appear in the 3D view canvas. The 3D Viewer provides functionality such as zoom in/out, rotation, translation, cross section, etc. Optionally, the user may activate a cross section view in the 3D view canvas 502 and manipulate the location of the cross section using a miniature top view 508.

While building a single structural model can be valuable, there is increased value in virtual fabrication that builds a large number of models. The virtual fabrication environment enables a user to create and run a virtual experiment. In a virtual experiment of the present invention, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability provided by the embodiments of the present invention may be used to mimic two fundamental types of experiments that are typically performed in the physical fab environment. Firstly, fabrication processes vary naturally in a stochastic (non-deterministic) fashion. As explained herein, embodiments of the present invention use a fundamentally deterministic approach for each virtual fabrication run that nevertheless can predict non-deterministic results by conducting multiple runs. The virtual experiment mode provided by an embodiment of the present invention allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode of the present invention enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment embodiments of the present invention can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 6:
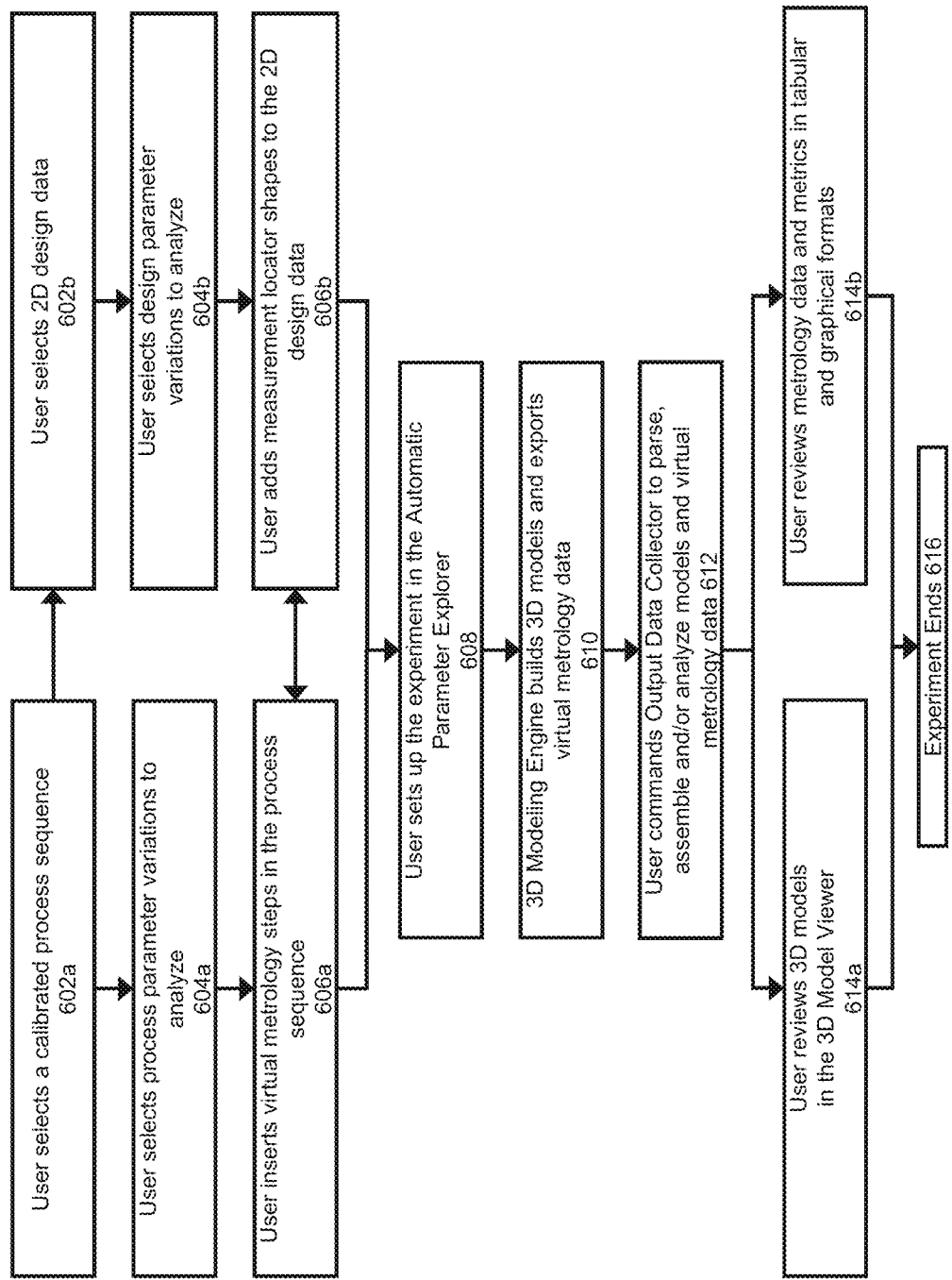
FIG. 6 depicts an exemplary sequence of steps performed in the virtual fabrication environment to set up and perform a virtual experiment generating virtual metrology measurement data for multiple semiconductor device structure models.
Figure 7:
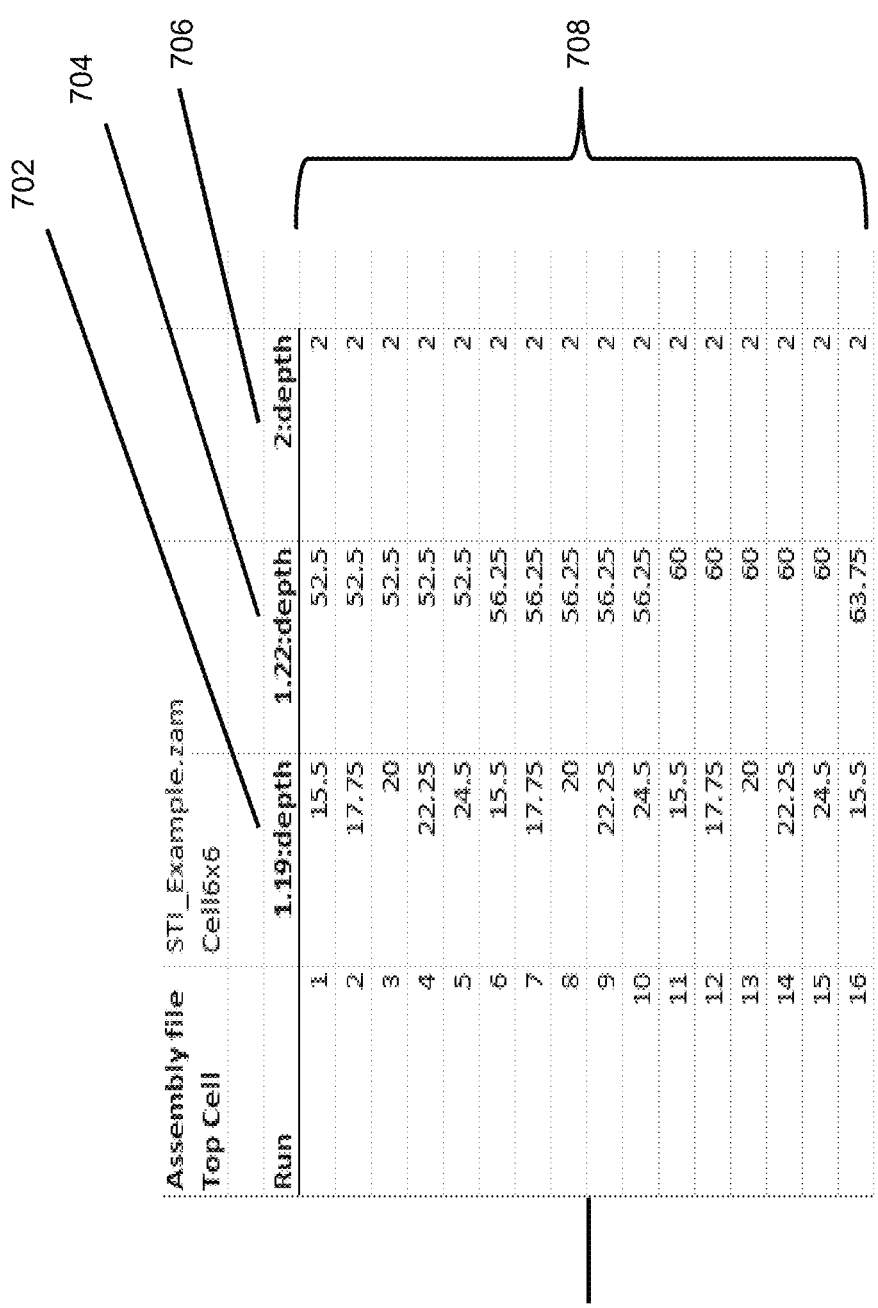
FIG. 7 depicts an exemplary parameter explorer view used to provide process parameters for a virtual experiment provided by the virtual fabrication environment.

FIG. 6 depicts an exemplary sequence of steps that may be performed in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 602a) and identifying/creating 2D design data (step 602b). The user may select process parameter variations to analyze (step 604a) and/or design parameter variations to analyze (step 604b). The user inserts one or more virtual metrology steps in the process sequence as set forth above (step 606a) and adds measurement locator shapes to the 2D design data (step 606b). The user may set up the virtual experiment with the aid of a specialized user interface, an automatic parameter explorer 126 (step 608). An exemplary automatic parameter explorer is depicted in FIG. 7 and may display, and allow the user to vary, the process parameters to be varied 702, 704, 706 and the list of 3D models to be built with their corresponding different parameter values 708. The parameter ranges for a virtual experiment can be specified in a tabular format. The 3D modeling engine 75 builds the 3D models and exports the virtual metrology measurement data for review (step 610). The virtual experiment mode provides output data handling from all Virtual Measurement/Metrology operations. The output data from the virtual metrology measurements may be parsed and assembled into a useful form (step 612).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 8 depicts an exemplary tabular-formatted display of virtual metrology data generated by a virtual experiment. In the tabular formatted display, the virtual metrology data collected during the virtual experiment 802 and the list of virtual fabrication runs 804 may be displayed.

Figure 9:
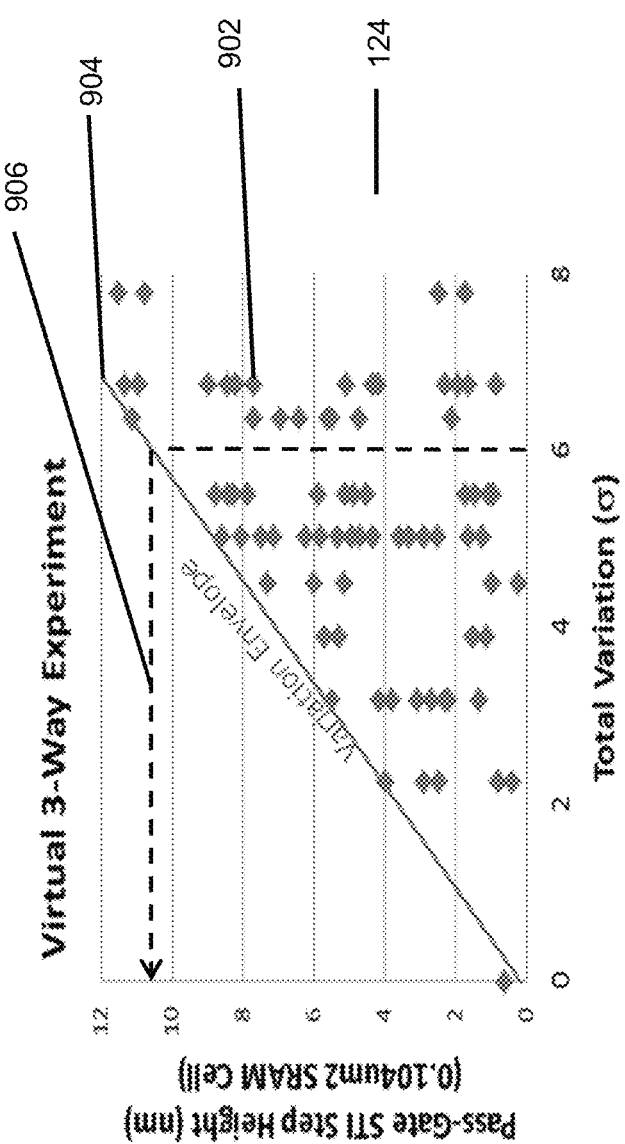
FIG. 9 depicts an exemplary graphical display of virtual metrology data generated in a virtual experiment provided by the virtual fabrication environment.

FIG. 9 depicts an exemplary 2D X-Y graphical plot display of virtual metrology data generated by a virtual experiment. In the example depicted in FIG. 7, the total variation in shallow trench isolation (STI) step height due to varying 3 parameters in preceding steps of the process sequence is shown. Each diamond 902 represents a virtual fabrication run. The variation envelope 904 is also displayed as is the depicted conclusion 906 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 614a) and review the virtual metrology measurement data and metrics presented for each virtual fabrication run (step 614b). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very computationally intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 of the present invention uses multiple cores and/or processors to perform individual modeling steps. In addition, the structural models for different parameter values in a set are completely independent and can therefore be built in parallel using multiple cores, multiple processors, or multiple systems.

3D modeling engine 75 may represent the underlying structural model using a voxel-based implicit geometry representation. Voxels are essentially 3D pixels. Each voxel is a cube of the same size, and may contain one or more materials, or no materials. An implicit geometry representation is one in which the interface between materials in the 3D structural model are defined without an explicit representation of the (x,y,z) coordinate locations of that interface. Many of the operations performed by the 3D modeling engine are voxel modeling operations. Modeling operations based on a digital voxel representation are far more robust than the corresponding operations in a conventional analog solid modeling kernel (e.g. a NURBS-based solid modeling kernel). Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

Some simulation tools require a volume mesh to be generated from some form of explicit boundary representation and previous solutions exist for creating a volume mesh of B-rep geometry or from surface meshes. Such volume meshes for finite-element or finite-volume simulation techniques will preserve the location of the interface between materials to a high level of accuracy. Such a volume mesh is called a boundary-conforming mesh or simply a conformal mesh. A key feature of such a mesh is that no element crosses the boundary between materials. In other words, for a volume mesh of tetrahedral elements, then each element is wholly within one material and thus no tetrahedron contains more than one material. However, neither B-rep and similar solid modeling kernels, nor surface mesh representations are optimal for virtual fabrication. Solid modeling kernels generally rely on a large number of heuristic rules to deal with various geometric situations, and modeling operations may fail when the heuristic rules do not properly anticipate a situation. Geometry representations that instead represent the boundaries implicitly do not suffer from these problems. A virtual fabrication system that uses an implicit representation exclusively thus has significant advantages, even if it may not represent the interfaces as accurately.

Figure 10A:
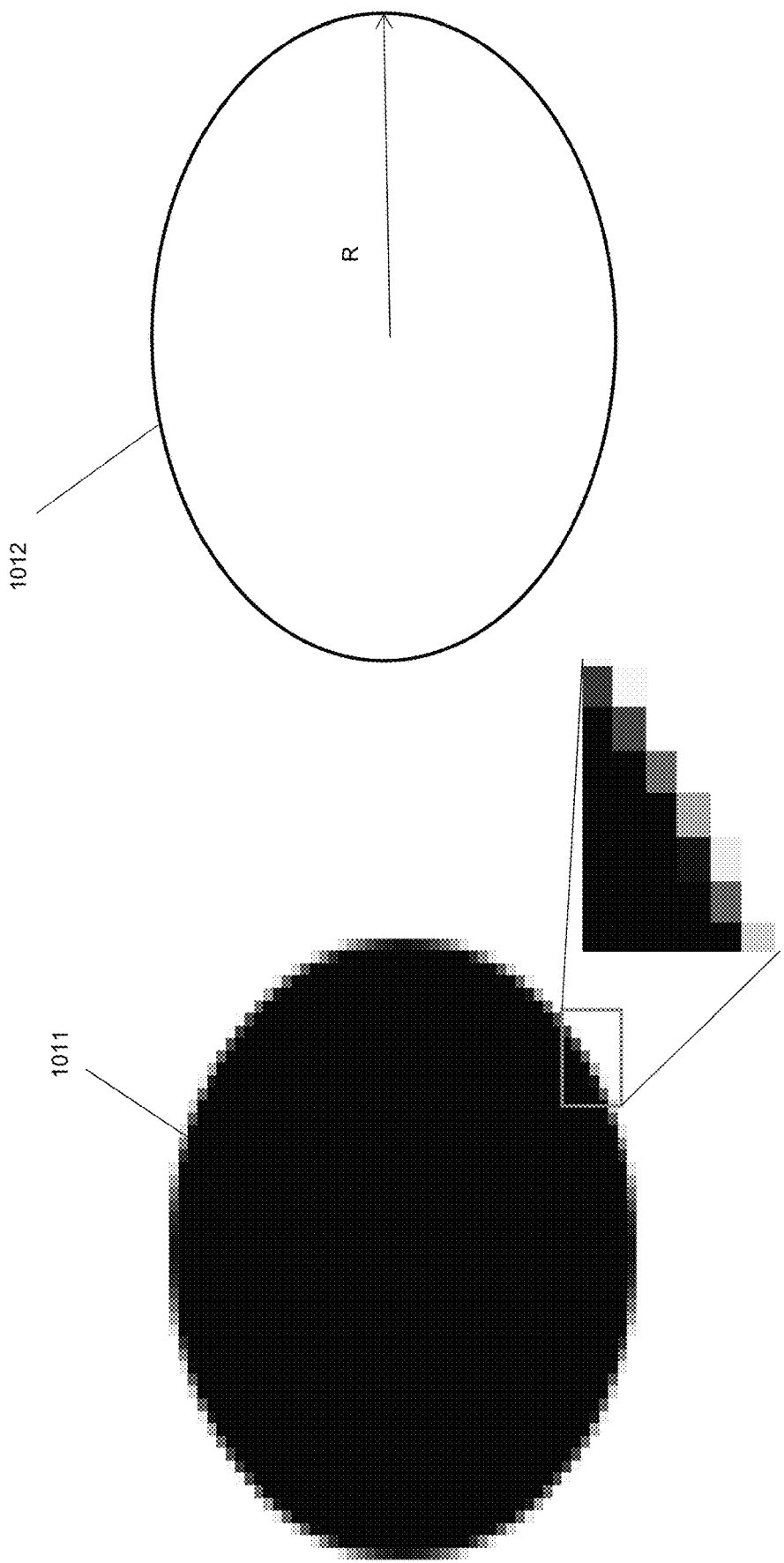
FIG. 10A depicts exemplary voxel-based representations of a circle boundary.

Geometric data represented with voxels implicitly represents the interface between materials. FIG. 10A illustrates this concept in two dimensions for a circle. A B-rep representation 1012 may represent the circle as the equation of a circle with radius R with material 1 inside the circle with material 2 outside. In contrast, a voxel representation of the circle 1011 is an array of cubes where each cube stores the material identification numbers within it, and the relative amounts of each material. The grayscale darkness of the squares in 1011 indicates the relative percentage of material 1 versus material 2. Black indicates 100% material 1 and 0% material 2, and white indicates 0% material 1 and 100% material 2. Since the circle cuts through the voxels along its path, grayscale voxels on the boundary of the circle are partially filled with each material and the darkness of gray indicates the fill fraction. Partially filled voxels indicate that the boundary crosses through that voxel, but does not indicate where and with what orientation. The fill fractions of a boundary voxel and others in its neighborhood may be used to determine the boundary explicitly.

Material properties at a location within the geometry are approximated using the properties of the majority material within each voxel. For instance, in an operation to determine electrical resistance if a boundary voxel is more than 50% of material 2 in circle 1011, then the bulk resistivity of material 2 is used for all values of x within that voxel, and similarly voxels of 50% or more of material 1 use bulk resistivity of material 1. This is equivalent to filling those voxels full of the majority material as shown in FIG. 10B, circle 1021. This approach incurs what is called 'staircasing' error in the solution over methods that explicitly know the boundary location, and thus know precisely the material at each location, x. One method to compensate for staircasing error is to decrease the size of each voxel when performing the virtual fabrication of the 3D model and thus reduce the volume of boundary voxels. For instance, circle portion 1022 is part of the circle of the voxel representation in 1011, and circle portion 1023 is the same part of the circle built with voxels one half of the size in each dimension. The volume taken up by boundary voxels is much less with the smaller voxel size and thus the error would be less. It should be noted however that decreasing the voxel size greatly increases both the virtual fabrication computation time as well as the simulation time which may lead to unacceptable results in some circumstances.

Depth-Dependent Oxidation Modeling

Thermal oxidation processes in semiconductor fabrication convert silicon on the wafer into a thin layer of silicon dioxide ($SiO_2$). The oxidation processes force an oxidizing agent, the oxidant, into the wafer at high temperature to trigger the reaction forming the $SiO_2$. The oxidation process may be a wet oxidation process performed using water vapor as the oxidant (such as Ultra High Purity (UHP) steam) or a dry oxidation process performed using molecular oxygen as the oxidant. The resulting layer of silicon dioxide may have a number of uses during fabrication. For example the $SiO_2$ may be used as an insulator or as a mask for ion implantation. In some of these oxidation processes the oxidant has a depth-dependent concentration distribution where the concentration varies depending on the height of the silicon feature receiving the oxidant with higher feature locations receiving more of the oxidant. This depth-dependent oxidant concentration may therefore result in a corresponding depth-dependent formation of $SiO_2$ (i.e. a depth-dependent oxidation). Embodiments of the present invention enable a virtual fabrication environment to perform depth-dependent oxidation modeling as part of the virtual fabrication of a semiconductor device of interest. More particularly, embodiments enable a depth-dependent oxidation modeling step to be inserted into a process sequence used during virtual fabrication of a semiconductor device structure.

Figure 11:
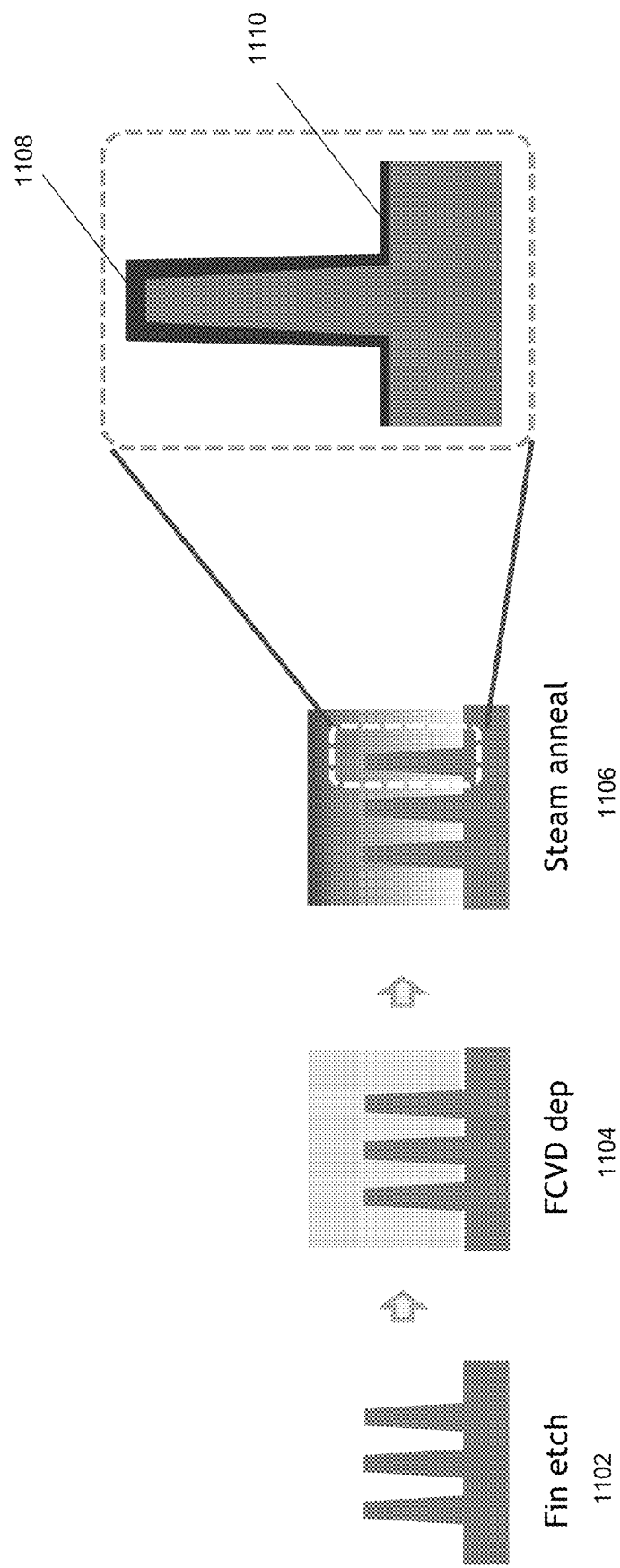
FIG. 11 depicts the occurrence of depth-dependent oxidation in an exemplary fabrication sequence.

FIG. 11 depicts the occurrence of depth-dependent oxidation in an exemplary fabrication sequence. During fabrication of a Fin (such as takes place during fabrication of a FinFet), following an etch step (step 1102) and Chemical Vapor Deposition (FCVD) (step 1104), a subsequent steam anneal process (step 1106) may result in an uneven oxidant distribution that is depth-dependent. The difference in oxidant distribution results in oxidation taking place unevenly that leads to a thicker layer of $SiO_2$ at the more vertical areas of the Fin 1108 than at the base 1110. Embodiments model this depth-dependent oxidation by determining a depth-dependent oxidant thickness distribution to mimic oxidant diffusion, and performing material replacement on the model along the silicon/air interface using that thickness distribution and a pre-determined fractional relationship of silicon to air to mimic Si consumption during thermal oxidation.

Figure 12:
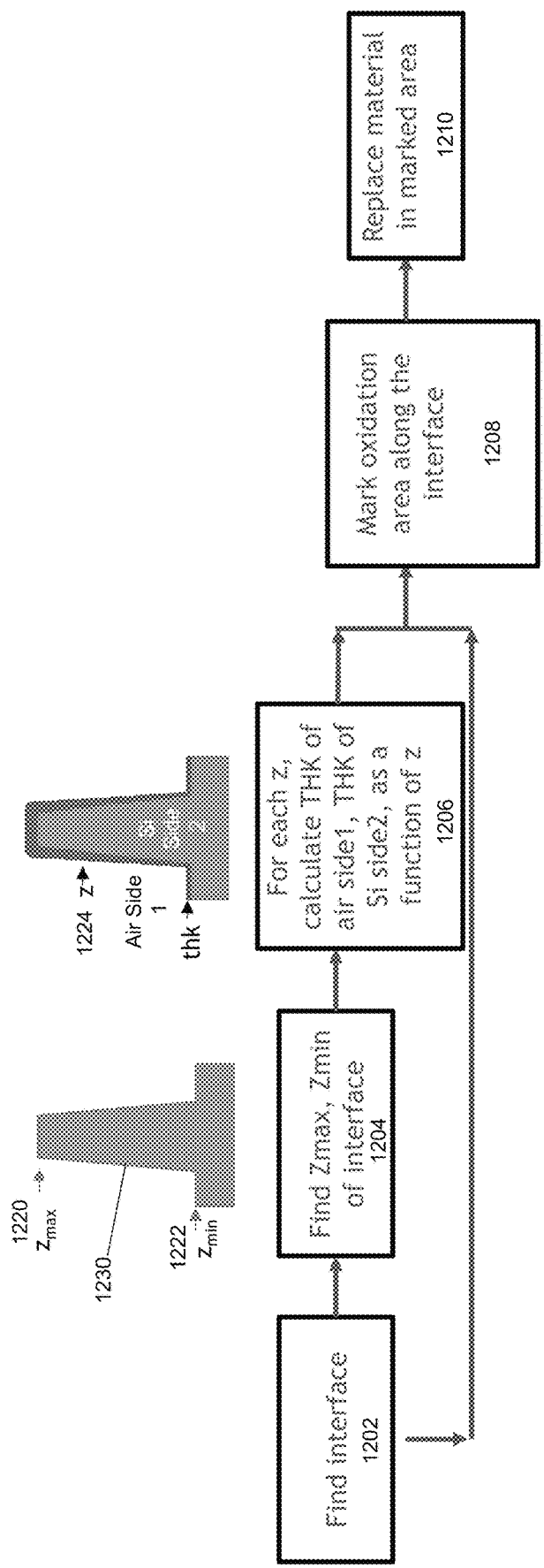
FIG. 12 depicts an exemplary sequence of steps for performing depth-dependent oxidation modeling in an exemplary embodiment.

FIG. 12 depicts an exemplary sequence of steps for performing depth-dependent oxidation modeling in an exemplary embodiment. The sequence begins in the virtual fabrication environment with the depth-dependent modeling module executing the depth-dependent oxidation modeling step of the process sequence by examining the model of the semiconductor device being virtually fabricated to determine the interface 1230 between silicon and air (step 1202). In one embodiment the 3D structural model of the semiconductor device being virtually fabricated is represented using a voxel-based implicit geometry representation. Once the interface 1230 has been identified, the depth-dependent oxidation modeling step further examines the model to determine $z_{max}$ 1220 and $z_{min}$ 1222 on the interface between the silicon and air portions of the 3D structural model of the semiconductor device structure, where z represents locations along a vertical axis representing height in the 3D structural model (step 1204). Then, for the different locations at height z 1224 along the interface 1230, the depth-dependent oxidation modeling step calculates a thickness distribution, for example an exponential thickness distribution, representing the thickness of the oxidant as a function of z for the air side 1 and the Si side 2 in the manner discussed further below (step 1206). The thickness will frequently be greater in the vertical areas that represent areas exposed to a greater amount of oxidant. As explained further below, the depth-dependent oxidation modeling step then traverses the interface and marks the oxidation area at each location z (step 1208) and then replaces the material (i.e. the air or silicon) in the marked areas along the interface in the 3D structural model with $SiO_2$ (step 1210).

In one embodiment, to calculate the thickness distribution of the oxidant, the depth-dependent modeling module uses fraction units of materials to estimate thickness. For example, the model may use fraction 0.44 units of Si plus 0.56 units of air to generate 1 unit of $SiO_2$ (i.e. to mimic Si consumption during oxidation) and calculates the thickness of the oxidation area at each location z along the interface for the air side 1 and the silicon side 2 as:

$$THK(z) \approx Exp(loading/(z_{max}-z_{min})*(z-z_{min}))*thk$$

where "loading" represents an oxidant loading parameter that controls the oxidation thickness difference between the top and bottom of the structure surface. In one embodiment a large loading value introduces a larger thickness difference between the top and bottom of the structure surface. In an embodiment, when the loading parameter value is set to '0', the 'THK' value equals the 'thk' value and does not change with z so that it is the same at the top and the bottom. Similarly, in an embodiment, when the loading value is set to −1 as in some of the exemplary DOE results of FIG. 15 the oxidation thickness is greater at the bottom of the structure interface than at the top. Although exponential distribution may in many instances accurately model depth-dependent oxidation, the present invention may be applied to any other distribution determined appropriate.

For example, when the thickness parameter 'thk' has a value set as 1 nm and the loading parameter value is set at 2, if the total interface height is 100 nm, the interface bottom oxide thickness will be "thk"(i.e. 1 nm), and the interface top oxide thickness will be $THK(z) \approx Exp(loading/(z_{max}-z_{min})*(z-z_{min}))*thk$ or $THK(100) \approx Exp(2/(100-0)*(100-0))*1 \approx 7.4$ nm. Similarly when z=25, the thickness at that location of the interface will be $THK(25) \approx Exp(2/(100-0)*(25-0))*1 \approx 1.65$ nm. For the oxide thickness along the interface, at each z, 44% of the thickness is located at the incoming Si area while the other 56% of the thickness is located at the incoming air area. This ratio setting of the oxidation result matches with the real thermal oxidation process which consumes 44% Si to generate 1 SiO2 by the law of conservation of atoms.

Embodiments thus enable different depth-dependent thickness distributions to be modeled. For instance, during a physical fabrication the loading condition is dependent on the oxidant distribution along the depth direction of the structure. For example, in an STI steam anneal process, the wafer surface has been already been covered with flowable CVD materials and the oxidant in the chamber transports to the wafer surface first, then diffuses into the flowable CVD material (within a certain range), then reaches to the Si surface, so the oxidant concentration on the top surface is higher than that on the bottom. When the oxidation surface is directly exposed to the oxidant (as occurs with thermal oxidation/wet oxidation with Si exposed to the oxidant), the oxidant does not need a diffuse process to reach the surface Si and so the oxidant distribution between top and bottom will have little difference, it will show even thickness. The final possibility that bottom oxidant concentration is thicker than top is rare and occurs only if the oxidant diffuses from bottom to top (requiring an oxidant source at the surface bottom which rarely occurs).

Once the oxidation thickness distribution has been determined for each location z, the depth-dependent modeling module then traverses the interface to mark the oxidation area on each side (air or silicon) of the interface as a precursor to material replacement. To mark the oxidation area, the depth-dependent modeling module allocates the predetermined fraction of the determined thickness of the oxidation area at each location z to the air side or to the silicon side of the interface. In some embodiments, a circle with a radius R1, where R1=0.56*THK (z) is moved along the interface with the center of the circle on the interface and at each location z on the interface the area within the radius R1 to the air side is marked for replacement. Similarly, a smaller circle with a radius R2, where R2=0.44*THK (z) is moved along the interface with the center of the circle on the interface and the area within the radius R2 to the silicon side is marked for replacement. This ensures that the appropriate percentage of each material is replaced to reflect the oxidation reaction while taking into account the differences in oxidant dispersion along different portions of the 3D structural model.

This traversal of the interface is visually represented in FIG. 13 which depicts an exemplary traversal to mark the oxidation areas along the interface in an exemplary embodiment. The traversal of the larger circle 1302 with radius R1 along the interface 1230 in the 3D structural model marks the oxidation area 1310 on the air side portion of the interface at z in which the air will be replaced by $SiO_2$. Similarly, the traversal of the smaller circle 1304 with radius R2 along the interface 1230 in the 3D structural model marks the oxidation area 1320 on the silicon side portion of the interface at z in which the silicon will be replaced by $SiO_2$. Subsequently during the material replacement step 1210 during depth-dependent oxidation modeling, the 3D structural model is updated to replace the marked air and silicon portions along the interface with $SiO_2$ to reflect the depth-dependent oxidation taking place during fabrication. For example, in a 3D structural model using a voxel representation, the voxels on the air side of the interface within the oxidation area that are holding material values representing air may be updated to hold values representing $SiO_2$ and the voxels on the silicon side of the interface within the oxidation area that are holding material values representing silicon may similarly be updated to hold values representing $SiO_2$.

Figure 14:
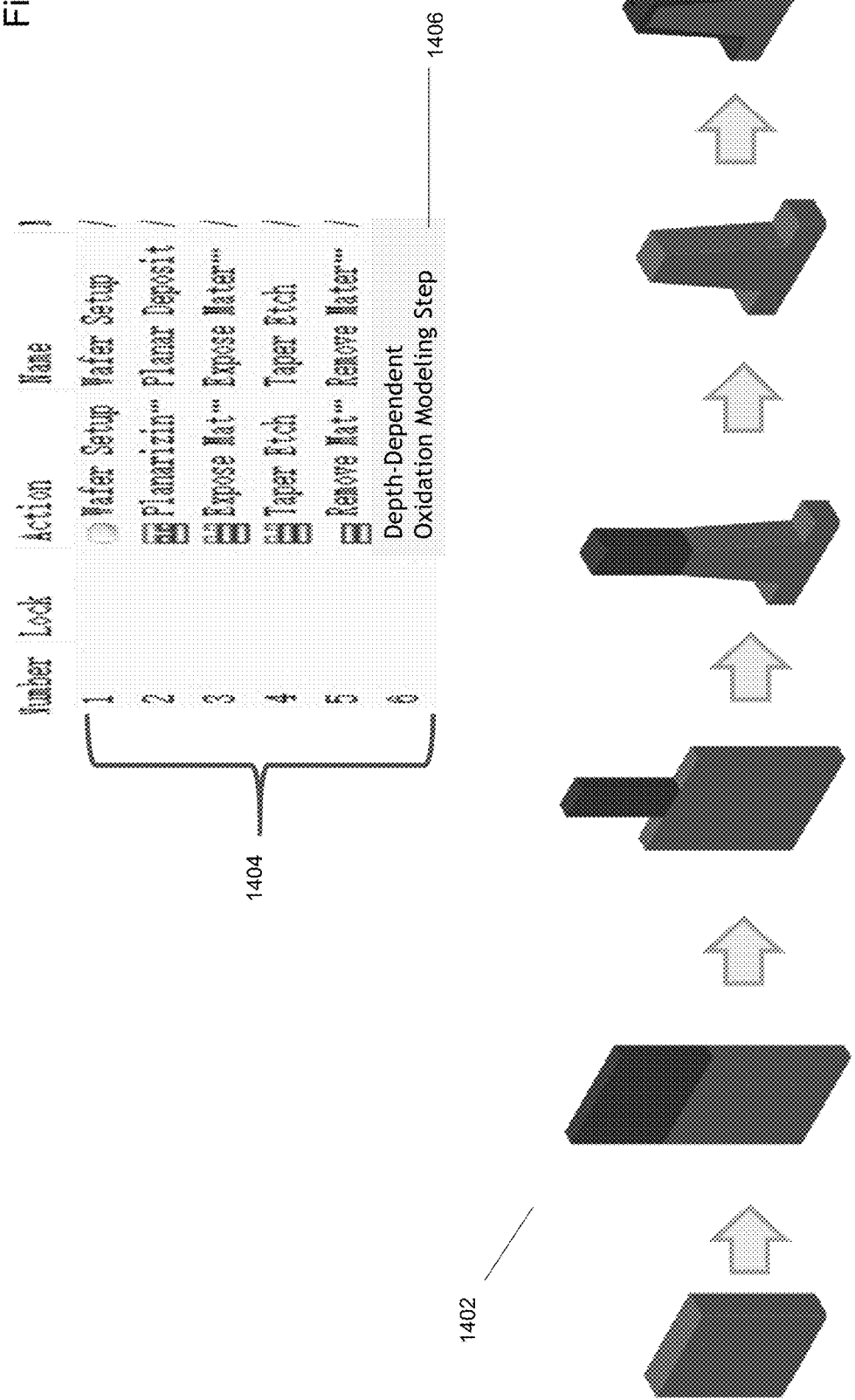
FIG. 14 depicts a virtual fabrication sequence for a Fin in an exemplary embodiment.

FIG. 14 depicts a virtual fabrication sequence for a Fin in an exemplary embodiment. More particularly, a graphical depiction 1402 is provided of the result of virtual fabrication sequentially proceeding through photolithography steps, etch steps, wet clean steps and then depth-dependent oxidation modeling resulting in the Fin covered in depth-dependent amounts of $SiO_2$ 1410. The process sequence 1404 includes a depth-dependent oxidation modeling step 1406. In one embodiment, the depth-dependent oxidation modeling step 1406 and one or more of its parameters is added by a user of the virtual fabrication environment via a provided graphical user interface. In another embodiment, the depth-dependent oxidation modeling step 1406 may be system-provided as part of a fabrication process template.

As noted above, in one embodiment, the depth-dependent oxidation modeling step 1406 may include a number of parameters that may be provided by a user via a graphical user interface provided in the virtual fabrication environment. For example, the depth-dependent oxidation modeling step 1406 may include, but is not limited to, parameters such as a loading parameter or an oxidation thickness parameter. In an embodiment the virtual fabrication environment may provide a user interface to receive parameters from a user.

Figure 15:
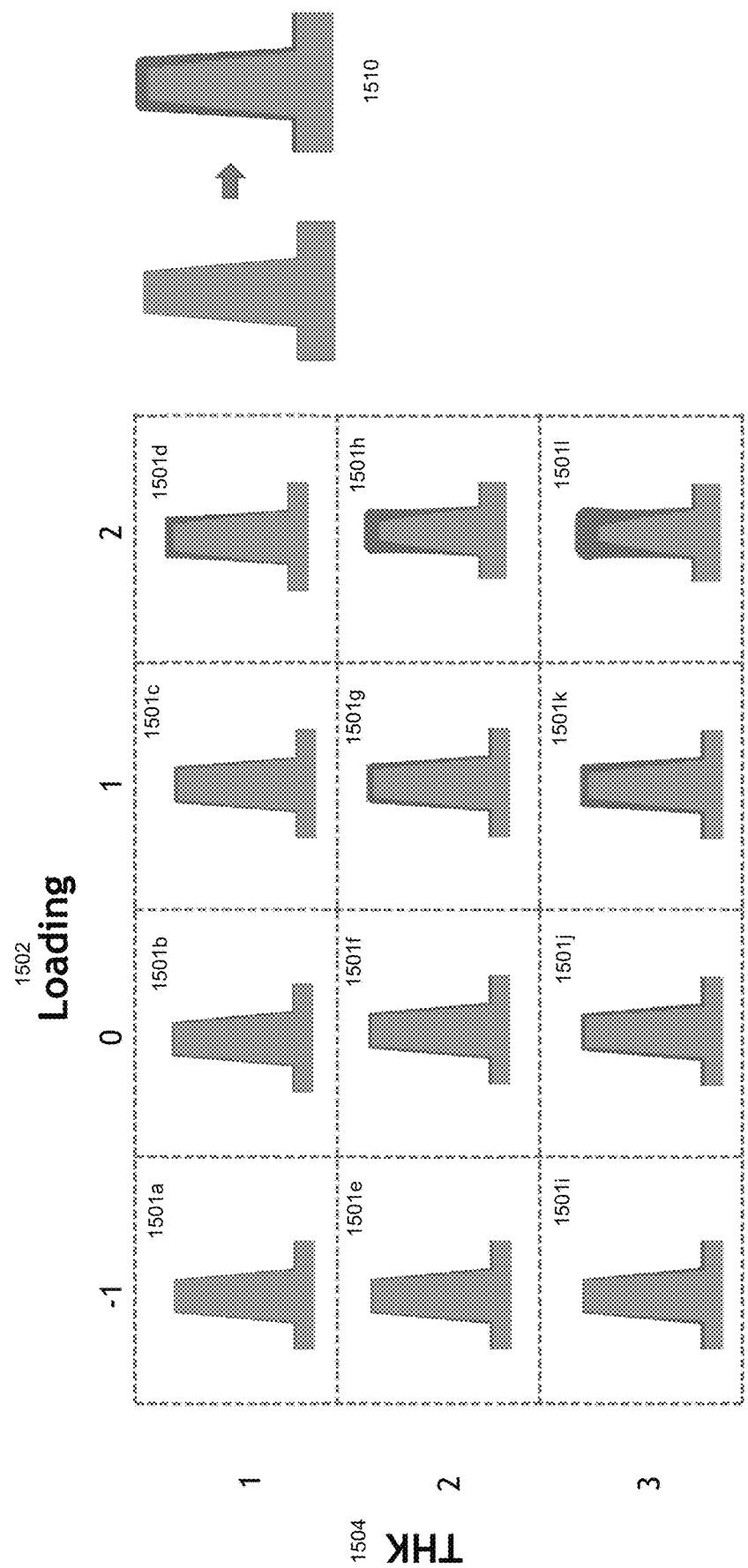
FIG. 15 depicts DOE results from an exemplary embodiment varying loading and thickness parameters.

The depth-dependent oxidation modeling step enables a Design of Experiments (DOE) to be conducted to perform multiple fabrication runs that vary the parameters of the depth-dependent oxidation modeling step in an attempt to identify an acceptable and/or optimal result. FIG. 15 depicts DOE results from an exemplary embodiment varying loading and thickness parameters. The results 1501a-1501l reflect fabrication runs generating models using loading parameters 1502 varying in the range of −1 to 2 and thickness parameters 1504 varying from 1 to 3. As indicated, the DOE enables a desired result 1510 to be identified based upon the combination of a virtual fabrication run conducted with a depth-dependent oxidation modeling step with a loading parameter of 1 and a thickness parameter of 3 (e.g. 3 nm).

Figure 16:
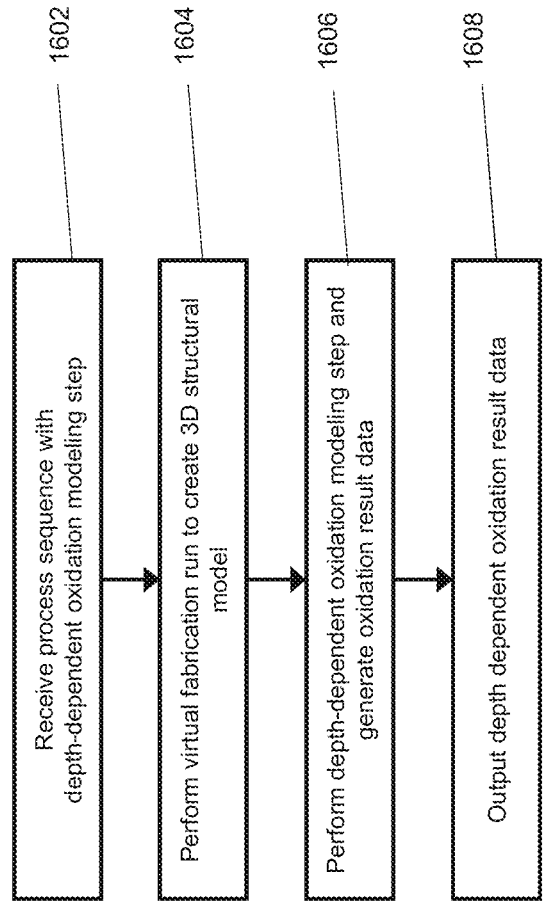
FIG. 16 depicts a sequence of steps performed in the virtual fabrication environment to perform depth-dependent oxidation modeling in an exemplary embodiment.

FIG. 16 depicts an exemplary sequence of steps performed in the virtual fabrication environment to perform depth-dependent oxidation modeling in an exemplary embodiment. The sequence begins by receiving in a virtual fabrication environment a process sequence that includes a depth-dependent oxidation modeling step (step 1602). In one embodiment, the depth-dependent oxidation modeling step may be added to the process sequence by a user via a process editor provided by the virtual fabrication environment. A virtual fabrication run is performed using the process sequence and generates a 3D structural model of a semiconductor device structure of interest (step 1604). The depth-dependent oxidation modeling step is performed at the indicated position in the process sequence and generates oxidation result data (step 1606) such as results of the depth-dependent oxidation modeling operations described herein depicting areas of oxidation in a 3D structural model. The depth-dependent oxidation result data is outputted (step 1608) via the virtual fabrication environment, for example, by exporting or displaying the oxidation result data.

While many oxidation processes occurring during virtual fabrication of a semiconductor device structure are a designed part of the fabrication process, occasionally unintended oxidation may occur. In one embodiment, the depth-dependent oxidation modeling as described herein may be performed to model unintended oxidation occurring during fabrication in addition to intended oxidation.

Depth-Dependent Etch Modeling

The concepts discussed above with respect to depth-dependent oxidation modeling steps may be adapted and extended in order to model other types of steps in the process sequence used to fabricate a semiconductor device structure. For example, embodiments of the present invention also enable a virtual fabrication environment to perform depth-dependent etch modeling as part of the virtual fabrication of a semiconductor device structure. More particularly, embodiments enable a depth-dependent etch modeling step to be inserted into a process sequence used during virtual fabrication of a semiconductor device structure.

Semiconductor fabrication process sequences frequently include one or more etching steps as part of the process sequence. The etching step is used to remove material or metal during fabrication of the semiconductor device structure. The etching steps being performed may be different types of etches such as different types of dry etches (performed with a plasma etchant) or a wet etch (performed with chemical etchant). The exemplary virtual fabrication environment discussed herein enables the modeling of etching steps as part of execution of the process sequence during virtual fabrication.

Similarly to the way in which the depth-dependent oxidation modeling operations previously discussed were affected by the distribution of oxidant, etching operations exhibit different performance characteristics based upon the distribution of etchant over the surface of the semiconductor device structure. The etchant concentration is frequently depth-dependent and therefore leads to depth-dependent etch behavior. Embodiments of the present invention enable this depth-dependent etch behavior to be accurately modeled in the virtual fabrication environment by including a user-specified depth-dependent etch modeling step in the process sequence.

The etchant used to perform etching operations may have a depth-dependent concentration distribution in a specific type of process. For example such a depth-dependent concentration may be seen when performing a steam liner etch where a Tungsten (W) or other metal liner has been deposited as a liner in a deep trench/via as a conductor. The deposition of the liner may create an incoming trench/via profile with a bowing/chamfer profile that creates an overhang on the trench/via top and/or voids on the bottom of the trench/via that are undesirable. One solution to this problem is to use a depth-dependent etch to amend the top metal profile to make it friendly for downstream deposition. This depth-dependent etchant concentration may lead to a depth-dependent etch result on the liner material. This type of depth-dependent etch result is visually depicted in FIG. 17.

Figure 17:
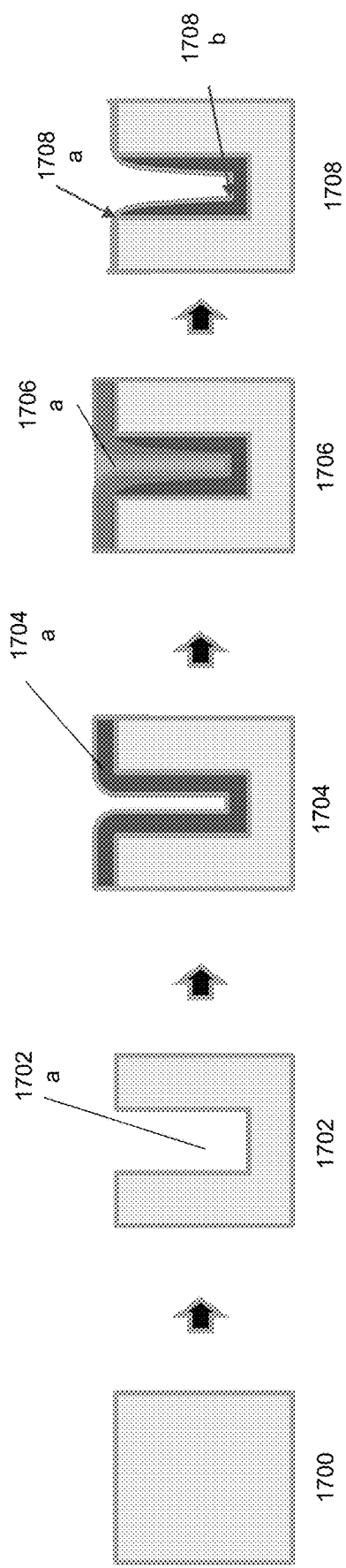
FIG. 17 graphically depicts an exemplary result of etching a liner that had been deposited into a trench during fabrication of a semiconductor device structure.

FIG. 17 graphically depicts an exemplary result of etching a liner that had been deposited into a trench during fabrication of a semiconductor device structure. In FIG. 17, an initial surface 1700 undergoes a trench patterning step 1702 to create a trench 1702a. A liner deposition step 1704 is then performed to deposit a liner 1704a, such as a metal liner, in the trench 1702a. A liner etch step 1706 is then performed to apply an etchant 1706a (such as steam or another gas) to remove a portion of the liner 1704a. However, because the etchant 1706a tends to accumulate in a greater volume near the top of the structure being fabricated and accumulate in a comparatively lesser volume near the bottom of the structure being fabricated, the etch rate (and corresponding amount of etching) differs in the vertical (z) direction. For example, as depicted in FIG. 17, in the output structure 1708 there is a comparatively greater area 1708a of etching of the liner 1704a at the top of the trench 1702a where most of the liner has been etched away and a comparatively lesser area 1708b of etching of the liner at the bottom of the trench where most of the liner is intact.

Embodiments of the present invention behaviorally solve for a depth-dependent etch. For instance, etch rate distribution may be calculated, and/or etchant concentration distribution may be determined. In one embodiment, an etch rate exponential distribution is first calculated as explained further below and an etchant concentration distribution is then set proportionally to the etch rate distribution by the virtual fabrication environment in order to determine the depth-dependent output of the etching step. The etch rate at a particular vertical height z location on the interface between the material being etched (the metal liner in the above example) and the surrounding air is calculated based on an exponential distribution. This etch rate distribution is used to model the etchant concentration distribution (through the z direction) which controls the amount of etching that takes place in the trench/via or other feature. Although exponential distribution may in many instances accurately model depth-dependent etch rate or etchant concentration, the present invention may be applied to any other distribution determined appropriate.

Figure 18:
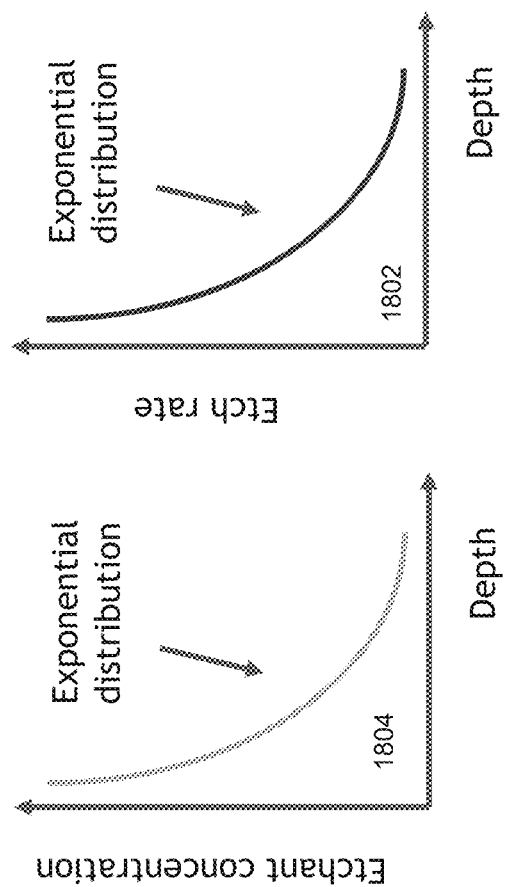
FIG. 18 depicts a proportional relationship between an etch rate distribution and an etchant concentration distribution in an exemplary embodiment.

Embodiments calculate an etch rate distribution along the material/air interface in the structural model in the area being etched that corresponds to the amount of etchant concentration distribution. FIG. 18 depicts a proportional relationship between an etch rate distribution and an etchant concentration distribution in an exemplary embodiment. As depicted, the etch rate distribution 1802 is exponential such that the etch rate is greater in the z direction and decreases with depth. The result of this etch rate distribution characteristic is that the corresponding etchant concentration distribution 1804 has the same sort of exponential distribution with the etchant concentration being greater in the z (vertical) direction and a comparatively reduced concentration as depth increases in the device structure being fabricated. It will be appreciated that this etchant concentration distribution is greater in the vertical direction as the more vertical portions of the semiconductor device structure being fabricated tend to be closer to the etchant source during fabrication than the deeper portions of the device structure such as, for example, the bottom of a trench, with the result that more etchant concentrates on those more vertical locations nearer to the etchant source. Further, if the plasma has an angle distribution, only etchant traveling at a particular angle is able to reach the bottom of a trench or via due to the shadowing effect. while much more plasma can reach the top which is more visible. This angle distribution therefore also results in an etch ratio loading.

Figure 19:
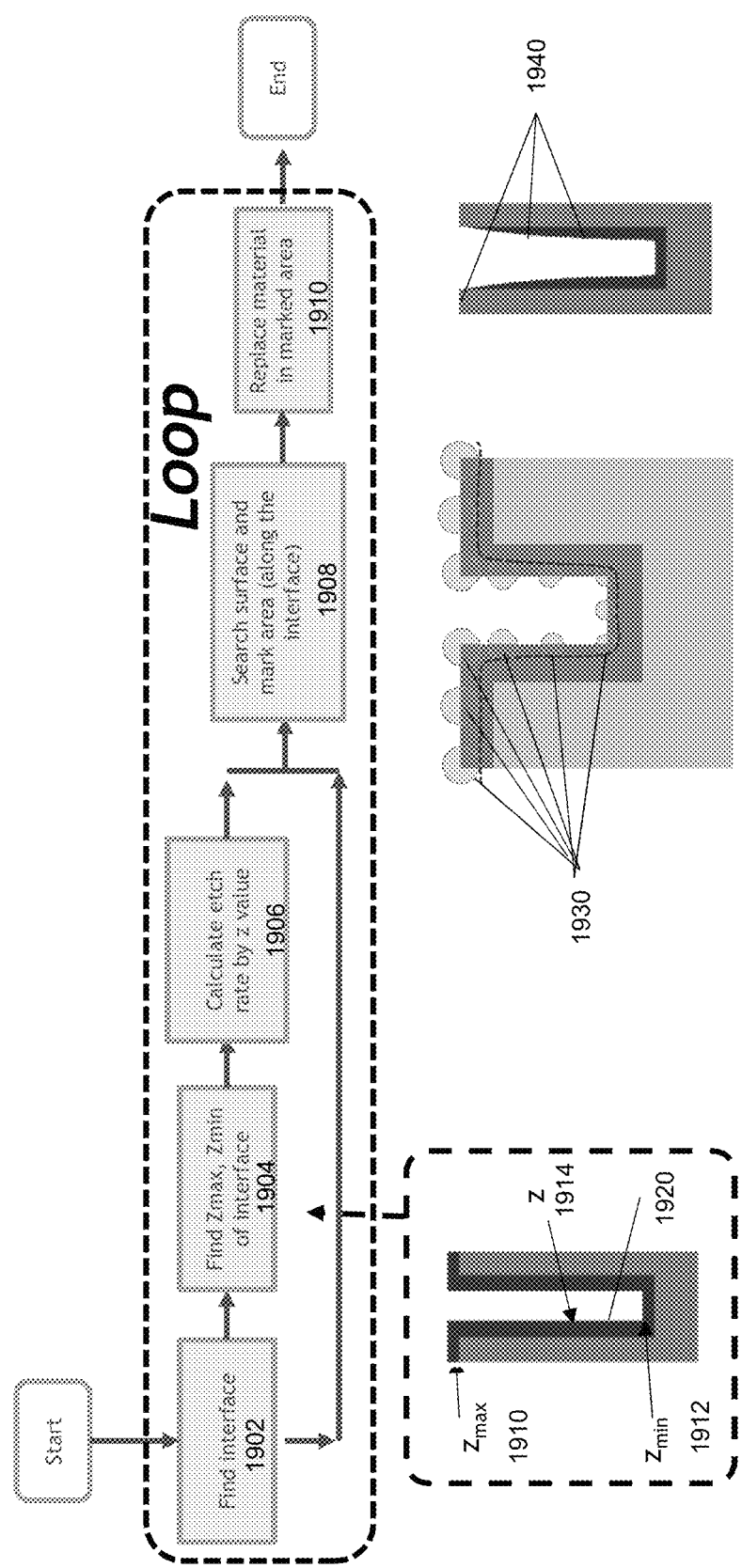
FIG. 19 depicts an exemplary sequence of steps for performing depth-dependent etch modeling in an exemplary embodiment.

FIG. 19 depicts an exemplary sequence of steps for performing depth-dependent etch modeling in an exemplary embodiment during which an exponential etch rate distribution is calculated and used to determine the etchant concentration distribution. The sequence begins in the virtual fabrication environment with the depth-dependent modeling module executing the depth-dependent etch modeling step of the process sequence by examining the model of the semiconductor device being virtually fabricated to determine the interface 1920 between the liner and air (step 1902). In one embodiment the 3D structural model of the semiconductor device being virtually fabricated is represented using a voxel-based implicit geometry representation. Once the interface 1920 has been identified, the depth-dependent etch modeling step further examines the model to determine $z_{max}$ 1910 and $z_{min}$ 1912 on the interface between the liner and air portions of the 3D structural model of the semiconductor device structure, where z represents locations along a vertical axis representing height in the 3D structural model (step 1904). Then, for different heights z 1914 along the interface 1920, the depth-dependent etch modeling step calculates an exponential etch rate distribution representing the thickness of the etchant as a function of z as described further below (step 1906). The etchant rate will frequently be greater in the vertical areas as those areas are frequently exposed to a greater amount of etchant. As also explained further below, the depth-dependent etch modeling step then traverses the interface in the structural model and marks the etchant concentration area at each location z 1930 based on the corresponding etch rate (step 1908) and then replaces the liner material in the marked areas along the interface in the 3D structural model with air to indicate the areas 1940 of the liner that have been etched away during the etching step (step 1910).

In one embodiment, the etch rate at each location z along the interface may be calculated as:

$$T(z) \approx \mathrm{Exp}((z-z_{max})/D)*\mathrm{thk}$$

where thk is the maximum etch rate and D is the diffusion length. Embodiments represent the etchant concentration using a diffusion model in which the concentration is diffuse from top to bottom. The etchant concentration thus has an exponential distribution equal to the etch rate on the top and a diffusion length controlling a decay in the etch rate at bottom. Further, embodiments performing depth-dependent etch modeling may set the etch rate proportional to the etchant concentration and thus use an exponential expression for the etch rate distribution along the z direction. The etch rate parameter itself thus usually reflects the etch rate only at the very top of the trench/via, while an etch rate with decay length (diffusion parameter) mimics the etch rate loading between top and bottom. In an embodiment, the decay length can be adjusted by a user to mimic the etch conditions determined in a physical fab.

Figure 20:
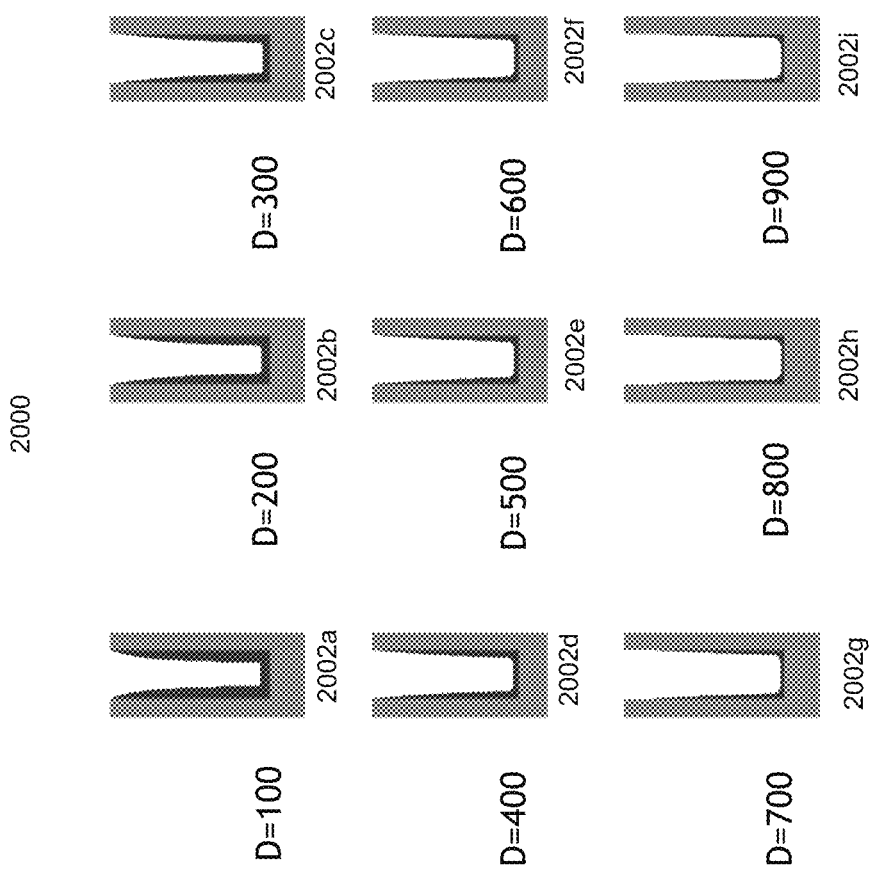
FIG. 20 graphically depicts DOE results varying diffusion parameters in an exemplary embodiment.

The depth-dependent etch modeling step enables a Design of Experiments (DOE) to be conducted to perform multiple fabrication runs that vary the parameters of the depth-dependent etch modeling step in an attempt to identify an acceptable and/or optimal result. FIG. 20 graphically depicts DOE results 2000 varying diffusion length parameters in an exemplary embodiment. The results 2002a-2002i reflect fabrication runs generating structural models using diffusion length parameters varying in the range of 100 to 900. Embodiments enable the etch loading between top and bottom to be adjusted by changing the parameter of D (diffusion/decay length), This adjustability makes the modeling more flexible for the end user to generate their own etch behavior based on the user's Si data.

In one embodiment, the depth-dependent etch modeling step supports etching two different materials at the same time with the depth dependent etch rate distribution being user adjustable. FIG. 21 depicts a graphical user interface 2100 configured to accept parameters for a depth-dependent etch modeling step in an exemplary embodiment. For example, the graphical user interface may receive parameters to identify the wafer 2102, a first material 2104, a second material 2106, a thickness parameter 2108 indicating the maximum etch rate and a diffusion length parameter 2110. The parameters enable the user to define which materials are etchable during the process by adjusting "seed" and "mat" parameter. Then the user can adjust thk to control etch rate at the top and length to adjust the diffusion length to control the loading differences between the top and bottom of the feature being etched.

Figure 22:
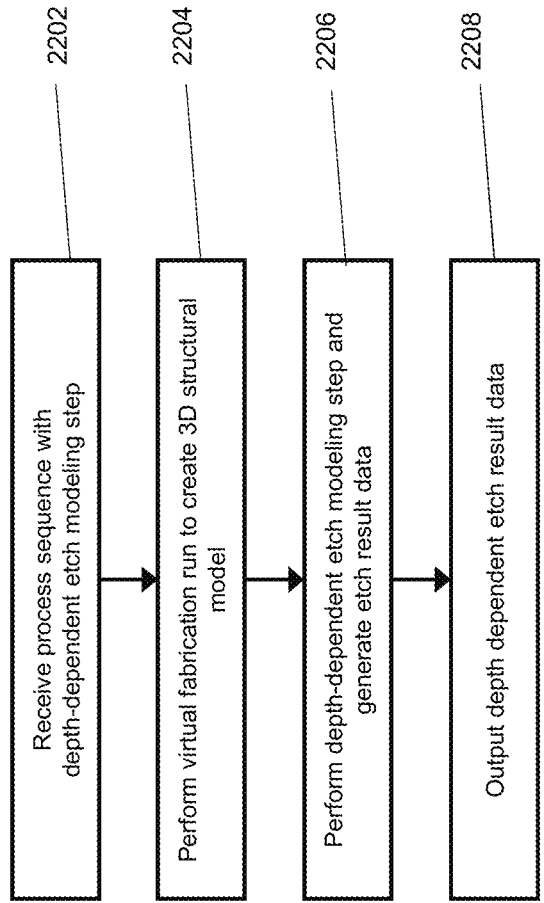
FIG. 22 depicts an exemplary sequence of steps performed in the virtual fabrication environment to perform depth-dependent etch modeling in an exemplary embodiment.

FIG. 22 depicts an exemplary sequence of steps performed in the virtual fabrication environment to perform depth-dependent etch modeling in an exemplary embodiment. The sequence begins by receiving in a virtual fabrication environment a process sequence that includes a depth-dependent etch modeling step (step 2202). In one embodiment, the depth-dependent etch modeling step may be added to the process sequence by a user via a process editor provided by the virtual fabrication environment. A virtual fabrication run is performed using the process sequence and generates a 3D structural model of a semiconductor device structure of interest (step 2204). The depth-dependent etch modeling step is performed at the indicated position in the process sequence and generates etch result data (step 2206) such as results of the depth-dependent etch modeling operations described herein that indicate how much of a particular metal or other target material has been etched away as a result of the performance of an etching operation specified in the process sequence. The depth-dependent etch result data is output (e.g.: exported or displayed) via the virtual fabrication environment (step 2208). In one embodiment, the depth-dependent etch result data is displayed via a 3D view provided by the virtual fabrication environment.

It should be appreciated that the depth-dependent oxidation modeling and depth-dependent etch modeling described herein may be provided in a number of different ways. For example, in one embodiment, the graphical user interfaces and some or all of the associated code for performing depth-dependent oxidation or etch modeling may be integrated into the virtual fabrication environment. In another embodiment, the graphical user interface and some or all of the associated code for performing depth-dependent oxidation or etch modeling may be provided via a plug-in or other external executable application or process that interacts with the virtual fabrication environment.

Although the description herein has discussed voxel-based models simulated by the virtual fabrication environment, it should be appreciated that embodiments of the present invention are not so limited. In some embodiments, the techniques described herein for depth-dependent oxidation modeling and depth-dependent etch modeling may be applied in virtual fabrication environments that do not rely on voxel-based representation of models.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding computer-executable instructions for performing depth-dependent oxidation modeling in a virtual fabrication environment, the instructions when executed causing at least one computing device to:
receive a process sequence for a semiconductor device structure to be virtually fabricated, the process sequence including a depth-dependent oxidation modeling step, the depth-dependent oxidation modeling step indicating a point during the process sequence for depth-dependent oxidation modeling to be performed;
perform with the computing device a virtual fabrication run that models an integrated process flow used to physically fabricate the semiconductor device structure by using the process sequence and two-dimensional (2D) design data to simulate patterning, material addition and/or material removal steps performed to physically fabricate the semiconductor device structure, the virtual fabrication run:
executing the process sequence up until the depth-dependent oxidation modeling step, the executing building a three-dimensional (3D) structural model of the semiconductor device structure, the 3D structural model predictive of a result of a physical fabrication of the semiconductor device structure, and
performing the depth-dependent oxidation modeling step within a region of the 3D structural model, the depth-dependent oxidation modeling step generating depth-dependent oxidation result data; and
outputting the depth-dependent oxidation result data generated from the depth-dependent oxidation modeling step.

2. The medium of claim 1 wherein the depth-dependent oxidation modeling step performs at least one of:

a thickness calculation of oxidant on both sides of an interface between silicon and air portions of the 3D structural model of the semiconductor device structure; and a traversal and marking of the interface in the 3D structural model to indicate areas of oxidation based on the thickness calculation.

3. The medium of claim 2 wherein the depth-dependent oxidation modeling step further performs material replacement in the areas of oxidation in the 3D structural model to replace silicon and air in the model with $SiO_2$.

4. The medium of claim 3 wherein the material is replaced according to the ratio 0.44 Si to 0.56 air per 1 unit of $SiO_2$.

5. The medium of claim 1 wherein the depth-dependent oxidation modeling follows steam anneal being performed following FCVD deposition.

6. The medium of claim 1 wherein the depth-dependent oxidation modeling step includes user-selectable parameters selectable via a user interface in the virtual fabrication environment.

7. The medium of claim 6 wherein the user-selectable parameters include one or more of a loading parameter and a thickness parameter.

8. The medium of claim 1 wherein the 3D structural model is a voxel-based model using an implicit geometry representation.

9. The medium of claim 1 wherein the virtual fabrication environment enables a Design of Experiment to be conducted that performs a plurality of virtual fabrication runs for virtually fabricating the semiconductor device structure using the depth-dependent oxidation modeling step.

10. The medium of claim 1 wherein the depth-dependent oxidation result data is output via a 3D view provided by the virtual fabrication environment.

11. A computing device-implemented method for performing depth-dependent oxidation modeling in a virtual fabrication environment, the computing device equipped with one or more processors, the method comprising:
    receiving a process sequence for a semiconductor device structure to be virtually fabricated, the process sequence including a depth-dependent oxidation modeling step, the depth-dependent oxidation modeling step indicating a point during the process sequence for depth-dependent oxidation modeling to be performed;
    performing with the computing device a virtual fabrication run that models an integrated process flow used to physically fabricate the semiconductor device structure by using the process sequence and two-dimensional (2D) design data to simulate patterning, material addition and/or material removal steps performed to physically fabricate the semiconductor device structure, the virtual fabrication run:
        executing the process sequence up until the depth-dependent oxidation modeling step, the executing building a three-dimensional (3D) structural model of the semiconductor device structure, the 3D structural model predictive of a result of a physical fabrication of the semiconductor device structure, and
        performing the depth-dependent oxidation modeling step within a region of the 3D structural model, the depth-dependent oxidation modeling step generating depth-dependent oxidation result data; and
    outputting the depth-dependent oxidation result data generated from the depth-dependent oxidation modeling step.

12. The method of claim 11 wherein the depth-dependent oxidation modeling step performs at least one of:
    a thickness calculation of oxidant on both sides of an interface between silicon and air portions of the 3D structural model of the semiconductor device structure; and
    a traversal and marking of the interface in the 3D structural model to indicate areas of oxidation based on the thickness calculation.

13. The method of claim 11 wherein the depth-dependent oxidation modeling step further performs material replacement in the areas of oxidation in the 3D structural model to replace silicon and air in the model with $SiO_2$.

14. The method of claim 13 wherein the material is replaced according to the ratio 0.44 Si to 0.56 air per 1 unit of $SiO_2$.

15. The method of claim 11 wherein the depth-dependent oxidation modeling follows steam anneal being performed following FCVD deposition.

16. The method of claim 11 wherein the depth-dependent oxidation modeling step includes user-selectable parameters selectable via a user interface in the virtual fabrication environment.

17. The method of claim 16 wherein the user-selectable parameters include one or more of a loading parameter and a thickness parameter.

18. The method of claim 11 wherein the 3D structural model is a voxel-based model using an implicit geometry representation.

19. The method of claim 11 wherein the virtual fabrication environment enables a Design of Experiment to be conducted that performs a plurality of virtual fabrication runs for virtually fabricating the semiconductor device structure using the depth-dependent oxidation modeling step.

20. The method of claim 11, further comprising:
    displaying the depth-dependent oxidation result data in a 3D view provided by the virtual fabrication environment.

21. A system for performing depth-dependent oxidation modeling in a virtual fabrication environment, comprising:
    at least one computing device equipped with one or more processors and configured to generate a virtual fabrication environment that includes a depth-dependent modeling module, the virtual fabrication environment configured to:
        receive a process sequence for a semiconductor device structure to be virtually fabricated, the process sequence including a depth-dependent oxidation modeling step, the depth-dependent oxidation modeling step indicating a point during the process sequence for depth-dependent oxidation modeling to be performed;
        perform with the computing device a virtual fabrication run that models an integrated process flow used to physically fabricate the semiconductor device structure by using the process sequence and two-dimensional (2D) design data to simulate patterning, material addition and/or material removal steps performed to physically fabricate the semiconductor device structure, the virtual fabrication run:
            executing the process sequence up until the depth-dependent oxidation modeling step, the executing building a three-dimensional (3D) structural model of the semiconductor device structure, the 3D structural model predictive of a result of a physical fabrication of the semiconductor device structure, and performing the depth-dependent oxidation modeling step within a region of the 3D structural model, the depth-dependent oxidation modeling step generating depth-dependent oxidation result data; and a display surface in communication with the at least one computing device, the display surface configured to display the depth-dependent oxidation result data.

22. The system of claim 21, wherein the depth-dependent oxidation modeling step performs at least one of:

a thickness calculation of oxidant on both sides of an interface between silicon and air portions of the 3D structural model of the semiconductor device structure;

a traversal and marking of the interface in the 3D structural model to indicate areas of oxidation based on the thickness calculation; and material replacement in the areas of oxidation in the 3D structural model to replace silicon and air in the model with $SiO_2$.

* * * * *